United States Patent [19]

Raver

[11] Patent Number: 4,468,732
[45] Date of Patent: Aug. 28, 1984

[54] AUTOMATED LOGICAL FILE DESIGN SYSTEM WITH REDUCED DATA BASE REDUNDANCY

[75] Inventor: Norman Raver, Yorktown Heights, N.Y.

[73] Assignee: International Business Machines Corporation, Armonk, N.Y.

[21] Appl. No.: 144,116

[22] Filed: Apr. 28, 1980

Related U.S. Application Data

[63] Continuation of Ser. No. 645,780, Dec. 31, 1975, abandoned.

[51] Int. Cl.³ .............................................. G06F 7/00
[52] U.S. Cl. .................................. 364/200; 364/300
[58] Field of Search ... 364/200 MS File, 900 MS File, 364/300

[56] References Cited

U.S. PATENT DOCUMENTS

| | | | |
|---|---|---|---|
| 3,388,381 | 6/1968 | Prynes | 364/200 |
| 3,568,155 | 3/1971 | Abraham | 364/300 |
| 3,579,194 | 5/1971 | Weinblatt | 364/300 |
| 3,614,746 | 10/1971 | Klinkhamer | 364/200 |
| 3,624,604 | 11/1971 | Gibbard | 340/146.3 AC |
| 3,644,898 | 2/1972 | Post | 364/200 |
| 3,646,524 | 2/1972 | Clark | 364/300 |
| 3,670,310 | 6/1972 | Bharnani | 364/300 |
| 3,678,461 | 7/1972 | Choate | 364/200 |
| 3,824,561 | 7/1974 | Wolf | 364/200 |
| 3,829,537 | 8/1974 | Farr | 364/200 |
| 4,042,912 | 8/1977 | Bachman | 364/200 |

FOREIGN PATENT DOCUMENTS

1521600 8/1978 United Kingdom ............... 364/300

OTHER PUBLICATIONS

Kobayashi, "Information & Information Processing Structure," *Information Systems Journal*, vol. 1, pp. 39–49, 4/75.
"A Survey of Generalized Data Base Management Systems," May 1969, *Cudasyl Committee Report*, pp. 5–28.
Bleier, "Treating Hiearchical Data Structures in the SDC TDMS," *Proceedings of ACM*, 1967, pp. 41–49.

*Primary Examiner*—James D. Thomas
*Assistant Examiner*—Archie E. Williams, Jr.
*Attorney, Agent, or Firm*—George E. Clark

[57] ABSTRACT

An associative file design method and apparatus are used for automatically generating an integrated data base design structure, with minimal data redundancy, for use in multi-application general purpose digital computing systems. The integrated data base design structure is automatically produced by a programmed digital computer in the form of a report or graph structure which permits the data base designer to design a data base system with minimal data redundancy. The data needed by each application program, i.e., the local data view, is specified with certain constructs. The local data views are checked to ensure that specified rules are followed. The collection of local views is processed on a general purpose digital computer to separate "keys" from "attributes," then to determine "implied" and "essential" associations, and finally to generate the integrated data base graph structure.

17 Claims, 25 Drawing Figures

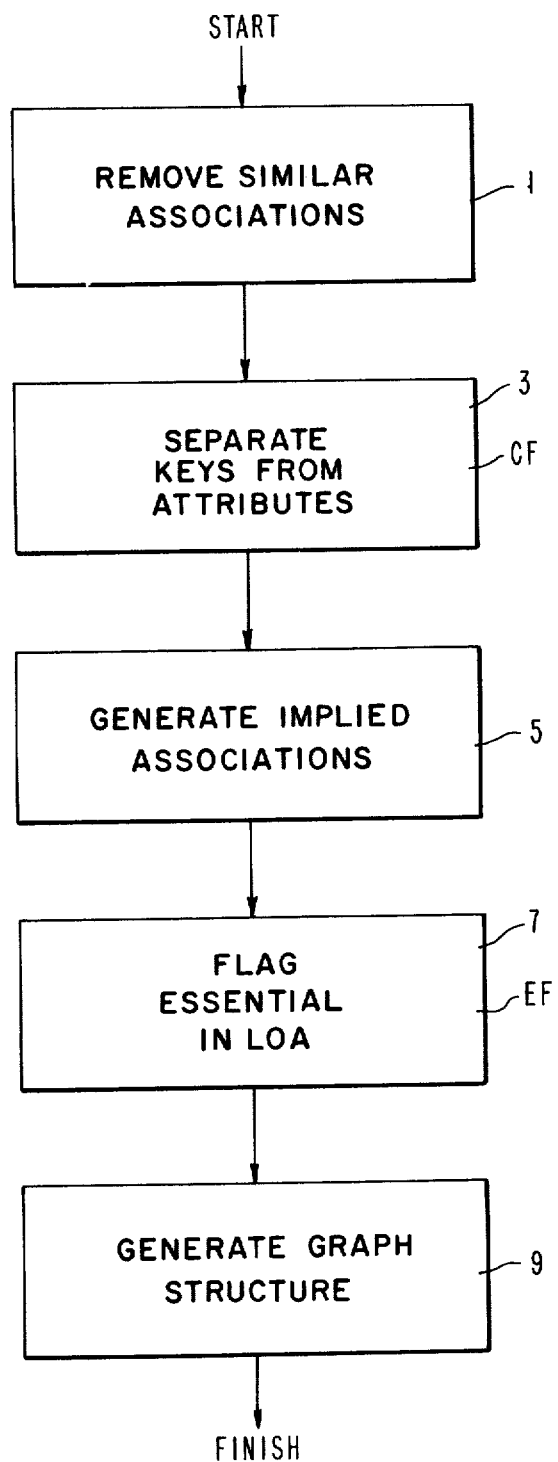

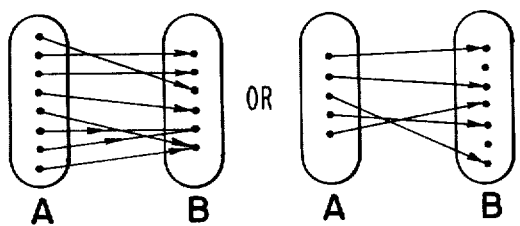
FIG. 1B1
(A,B)='1'
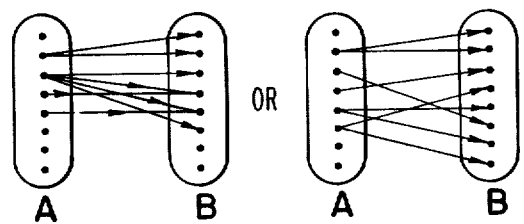
FIG. 1B2
(A,B)='M'
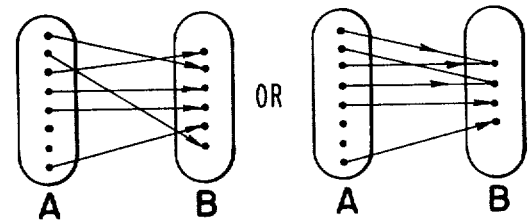
FIG. 1B3
(A,B)='C'
FIG. 1C
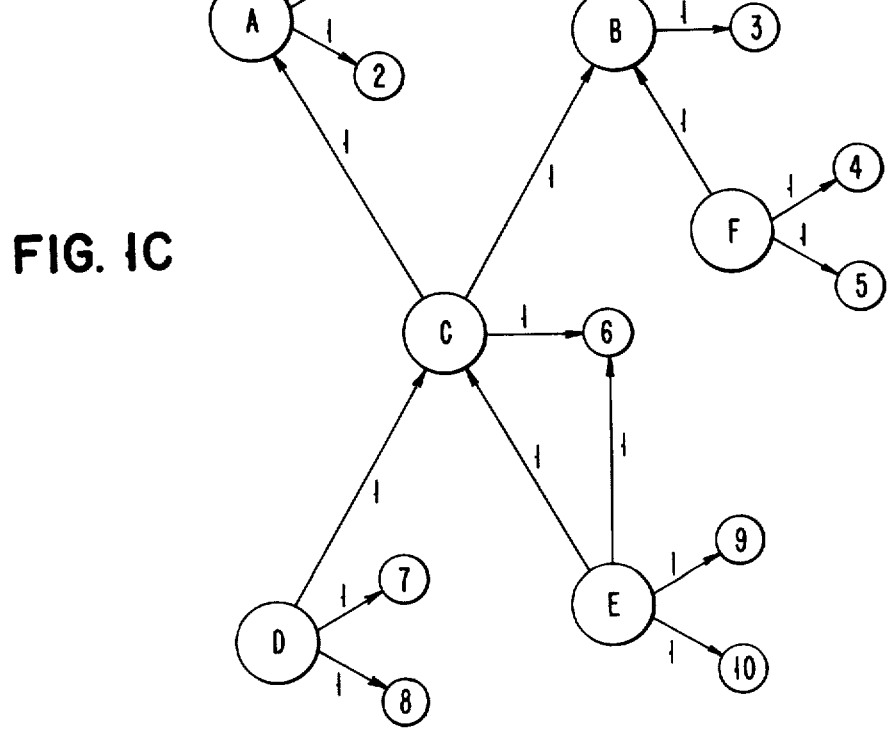

MODULE 1-STEP 1

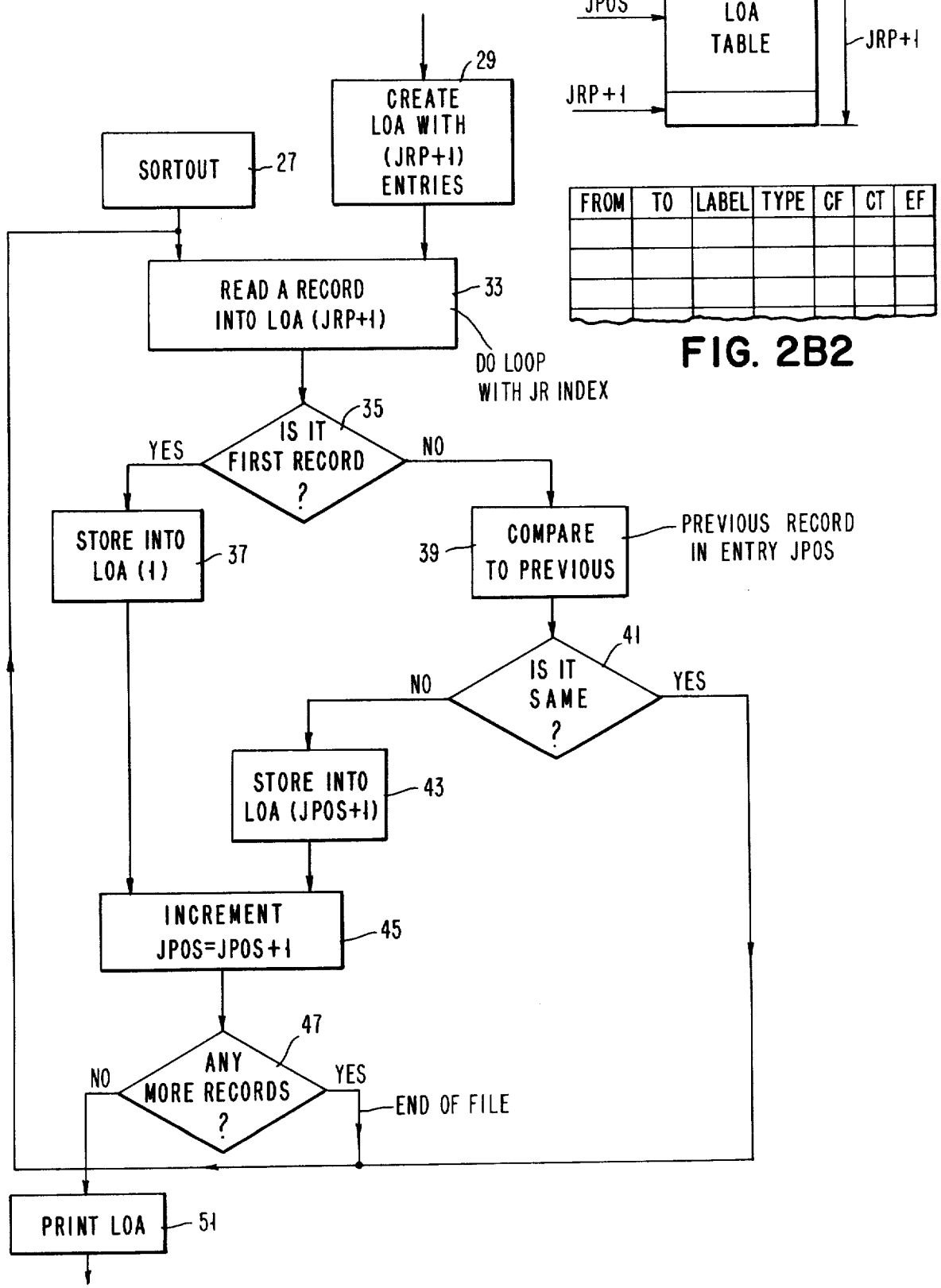

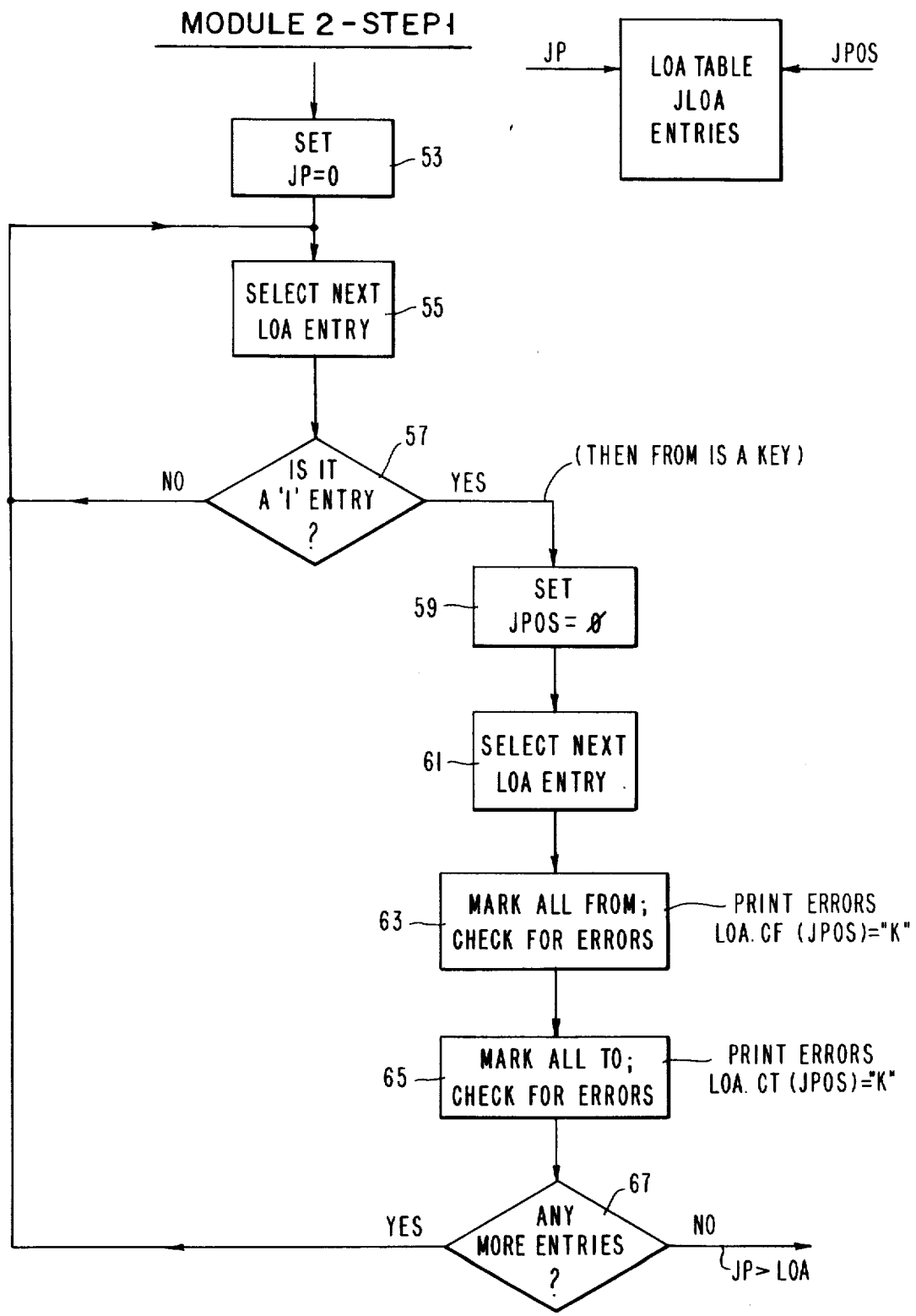

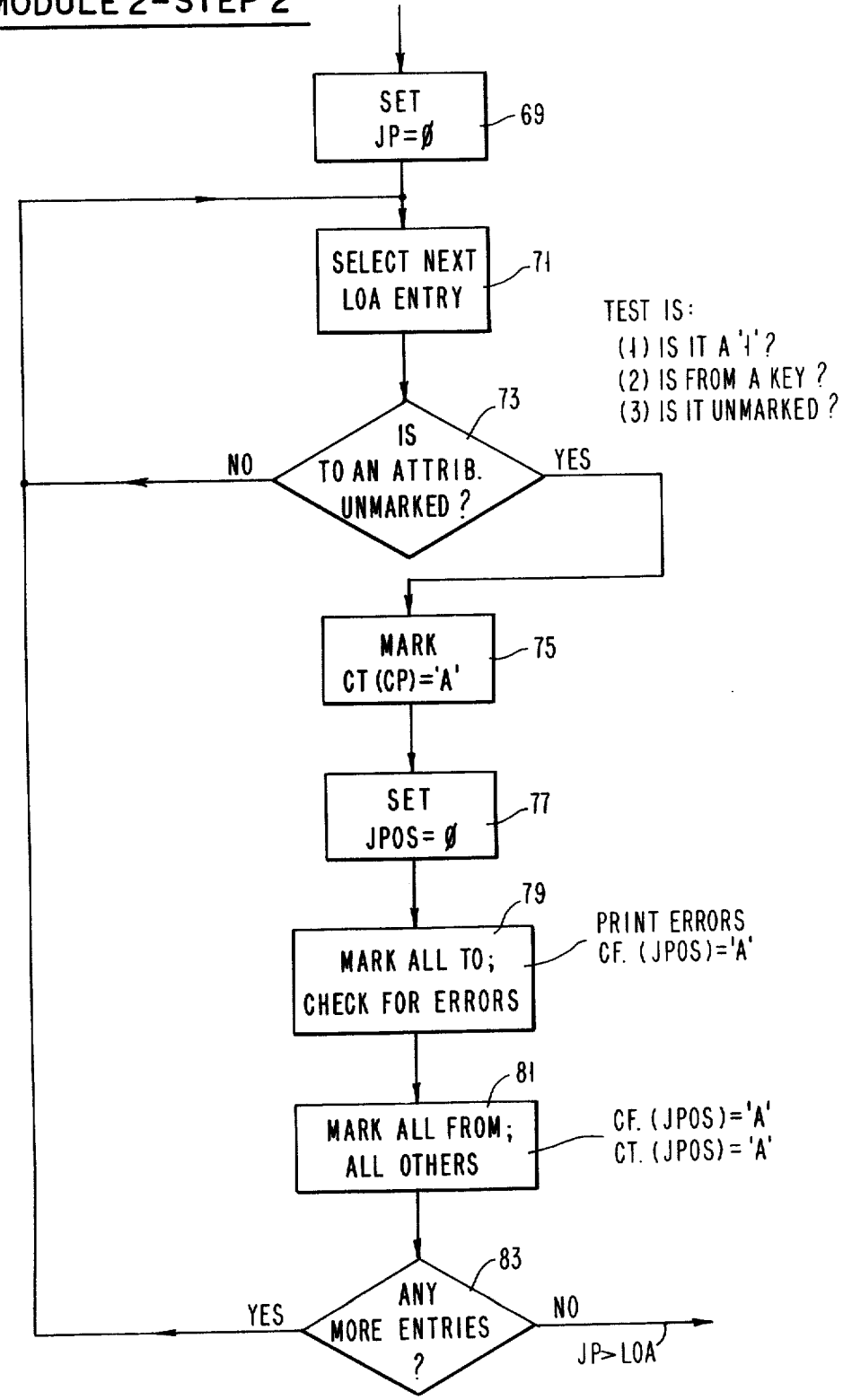

MODULE 2-STEP 3

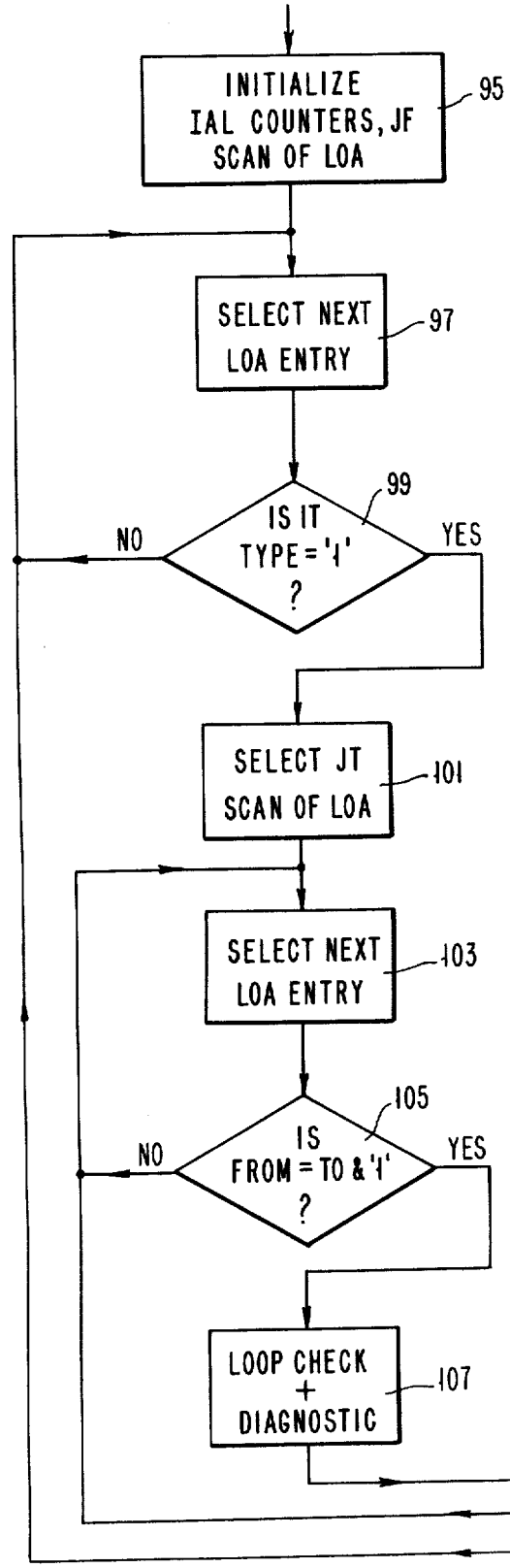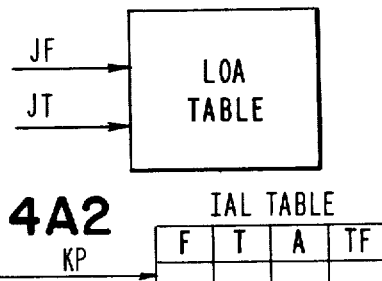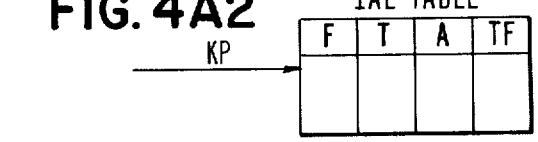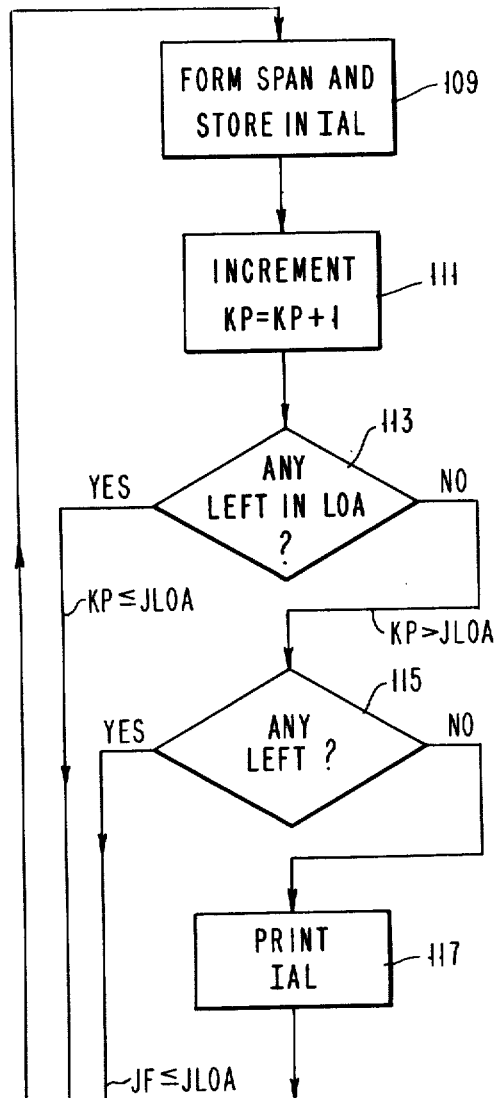

MODULE 3-STEP 2

SUBROUTINE NEXTIAL

SUBROUTINE SORTIAL

MODULE 4

MODULE 5-STEP 1

MODULE 5-STEP 2

MODULE 6 - STEP 1

AUTOMATED LOGICAL FILE DESIGN SYSTEM WITH REDUCED DATA BASE REDUNDANCY

This is a continuation of application Ser. No. 645,780 filed Dec. 31, 1975, now abandoned.

BACKGROUND OF THE INVENTION

1. Field of the Invention

The present invention relates to a method and apparatus for designing an integrated data base for a general purpose digital computer system. More particularly, the present invention relates to a computer method and apparatus for automatically designing the logic of an integrated data base, such that the network file organization of the data base has a minimum of data redundancy.

DESCRIPTION OF THE PRIOR ART

Integrated data bases for computers are well-known in the art. Various techniques have been employed to design the logical structure of integrated data base systems. In the main, these techniques involve many man hours and manual steps to formulate the structure and synthesize the data base system. One of the major problems encountered in data base design is attempting to keep track of the myriad of data and the associations between data such that the logical structure designed is free from error, quickly accessible and exhibits a minimum of data redundancy. It is evident that the extent of data redundancy is directly related to the cost of operating the computer system.

Heretofore, the methods employed to design an integrated data base system have been cumbersome and ineffective. In addition, the prior art techniques utilized for this purpose were not formalized but rather varied from individual to individual in accordance with the particular system being designed. Automatic methods for producing graph structures for logical file design were unknown. Although methods for automatically producing an integrated data base file design have been unknown, many proposals have been made for the organization and structure of data base systems. Typical of the prior art that exists on data base systems may be found by reference to the proceedings of the second symposium on computer-centered data base systems, System Development Corp., Santa Monica, Calif., December 1965, Vol. 1, Report No. TN-24/100/00 (AS-625-417), pp. 3-10 of Section 2 in an article entitled "State-of-the-Art Survey of Data-Base systems" by G. H. Dobbs.

SUMMARY OF THE INVENTION

In accordance with the principles of the present invention, a method and apparatus if provided which automatically generates a graph structure for the logical file design of an integrated data base system. The data needed by each application program of the system is first specified with certain constructs and rules. These are characterized as the local data view or LVIEW. The local data views are automatically checked by the computer process to ensure that the constructs and rules are followed. The collection of all local data views is then processed by the computer to separate "keys" from "attributes" and determine the "implied" associations that exist among the data elements. Then the "essential" associations that exist among data elements are determined, and a graph structure indicative of the "essential" associations is produced which characterizes an integrated data base network with a minimum of data redundancy.

It is, therefore, an object of the present invention to provide a method and apparatus for automatically producing the design structure for an integrated data base.

It is a further object of the present invention to provide a method and apparatus for producing an integrated data base design structure with minimal data redundancy.

It is yet a further object of the present invention to provide a method and apparatus for automatically generating an integrated data base design structure with minimal data redundancy for use in multi-application general purpose digital computer systems.

It is yet still a further object of the present invention to provide a method and apparatus for efficiently producing, in a systematic, efficient and simplified manner, a network file organization for use in multi-application general purpose digital computing systems which file organization exhibits minimal data redundancy and which may be used, for example, as a canonical representation to measure the amount of redundancy in the actual implemented data base.

It is another object of the present invention to provide an improved method and apparatus for designing the logical structure of an integrated data base which logical structure is free from error and is quickly accessible.

It is yet another object of the present invention to provide an improved method and apparatus for designing and organizing data base structures for use in a multi-application digital computer system such that the data base structure exhibits a minimum of data redundancy whereby the cost of operating the system is significantly reduced.

It is yet still another object of the present invention to provide a method and apparatus for automatically producing graph structures for the logical file design of an integrated data base for use in multi-application digital computer systems.

It is yet still another further object of the present invention to provide a data base design tool that aids in obtaining a more efficient and consistent design, and helps reduce design cycle time.

It is also an object of the present invention to provide a data base design tool the output of which provides a visual criteria for breaking the totality of data into a convenient and natural division of parcels for a distributed data base system having minimal interconnections with other parcels.

It is a further object of the present invention to provide a data base design method and device which automatically organizes application data requirements into segments and hierarchies for use by the data base designer.

The foregoing and other objects, features and advantages will be apparent from the following more particular description of the preferred embodiments of the invention illustrated in the accompanying drawings. For purposes of illustration, the specification relates to the execution of implemented programs operating under IBM Operating System/370, Model 155 VS2 (Release 1.7). The terms used in the specification in describing the present invention will be known to those familiar with the internal design of said Operating System. However, the various terms used are sufficiently defined in the context of the embodiments so as to be understood by one familiar with the internal design of an operating system for any general purpose computer.

To aid in the description of the preferred embodiments, a PL/1 code listing of the associative file design program method is presented as Appendix A at the end of the specification. Throughout the description provided in the specification, cross-reference is made to code identified by line numbers in the listing.

BRIEF DESCRIPTION OF THE DRAWINGS

FIG. 1A shows a block diagram representation generally depicting the various steps carried out by the digital computer, in accordance with the principles of the present invention.

FIGS. 1B1, 1B2 and 1B3 depict in graphical form the three basic types of data associations recognized by the disclosed embodiments of the program process in accordance with the principles of the present invention.

FIG. 1C depicts a directed graph structure used in the description to define the terms and relationships of data, as implemented in accordance with the program process of the present invention.

FIGS. 2A and 2B depict flow charts representing a more detailed way in which the general step represented by Block 1 of the overall process of FIG. 1A may be carried out.

FIGS. 2B1 and 2B2 represent tables created by the flow chart process described with regard to FIGS. 2A and 2B.

FIGS. 3A, 3B and 3C depict flow charts representing a more detailed way in which the general step represented by Block 3 of the overall process of FIG. 1A may be carried out.

FIG. 3A1 represents a table utilized in the flow-charted routine shown in FIG. 3A.

FIGS. 4A and 4B depict flow charts representing a more detailed way in which the general step represented by Block 5 of the overall process of FIG. 1A may be carried out.

FIGS. 4A1 and 4A2 represent tables used in the description of the flow charted process depicted in FIG. 4A.

DETAILED DESCRIPTION

Figure 2A:
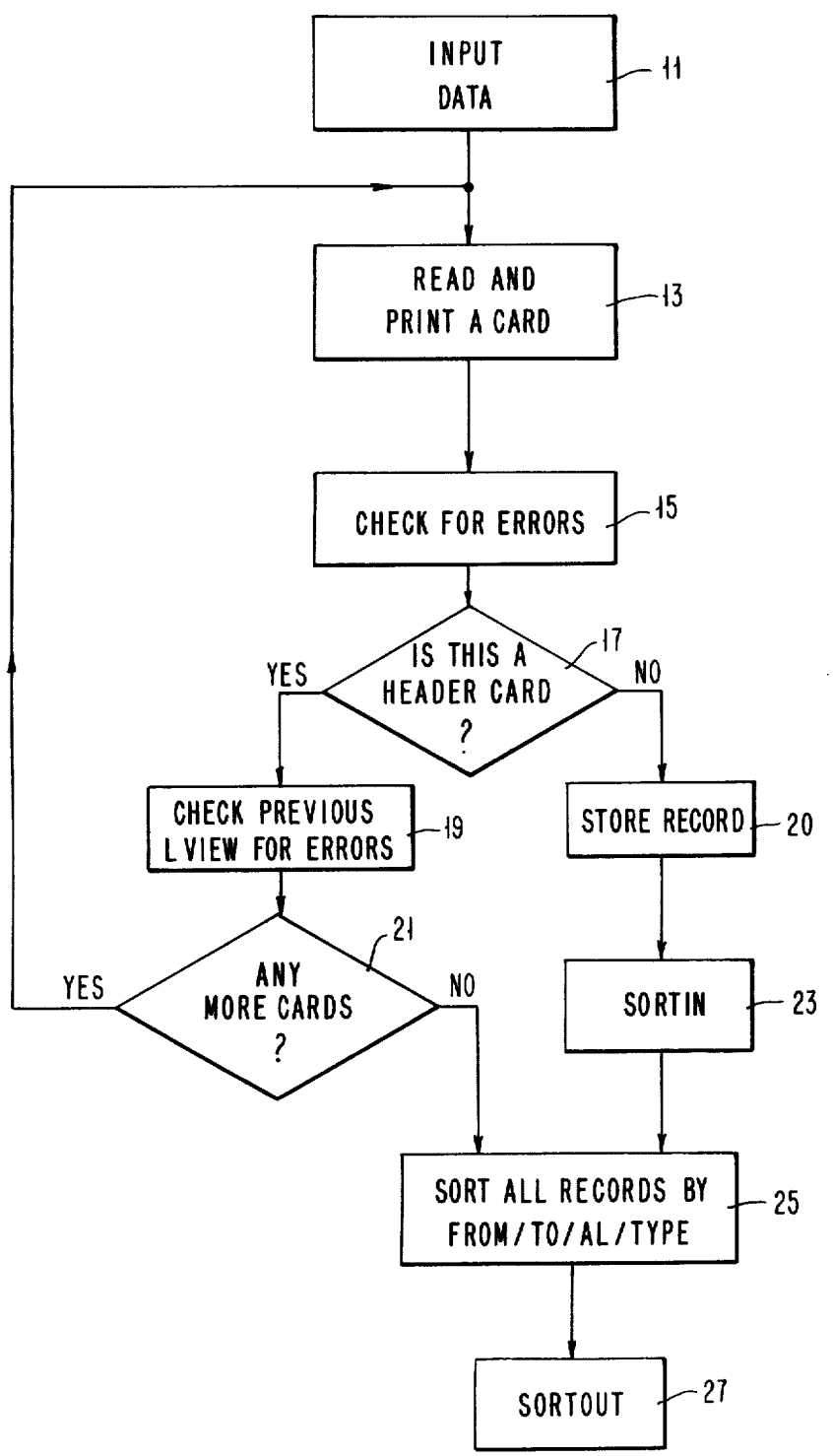

With regard to FIG. 1A, there is depicted a block diagram generally representing the overall process to be carried out by the general purpose digital computer, in accordance with the principles of the present invention. As is understood by those skilled in the art, any of a variety of general purpose digital computers may be programmed to carry out the several steps depicted in FIG. 1A. Typically, an IBM System/370 CPU utilizing, for example, OS/VS or DOS/VS may be used. In this regard, a System/370 Model 145 may be used with OS/VS and a Model 115 with DOS/VS. It is clear that other types and models of CPUs may be readily employed, in this regard.

As hereinabove indicated, for purposes of illustration the description of the various flow-chart routines is supported by cross-references to the detailed code set forth in a PL/1 program implementation of the present invention, as set forth in Appendix A. As previously indicated, the specific PL/1 program implementation appearing in Appendix A operates under an IBM Operating System/370, Model 155 VS2 (Release 1.7). As is understood by those skilled in the art, however, a particular program implementation of the various routines set forth in the drawings may be carried out through utilization of any of a variety of programming languages, such as Assembler Language, FORTRAN, etc.

Before describing the various steps set forth in the overall process depicted in block form in FIG. 1A, it is considered worthwhile to describe, by way of background, the nature of an integrated data base and the characteristics thereof. An integrated data base is generally described as network file organization with minimal data redundancy. With the advent of the sophisticated general purpose digital computer (computer), multiple applications of the computer to maximize its utilization was inevitable. Typically, in this regard, applications of the computer are extended in a piecewise manner, such that each application program may have its own data base, or at least its "own" view of the data base utilized in the system.

Basically, the integrated data base approach is a departure from the traditional batch processing approach. Prior to the integrated data base approach, each application area would comprise a series of runs, and each run would involve a batch of similar transactions. Each batch run would require data files structured for efficient processing; hence a considerable amount of processing time would be expended in restructuring data files between batch runs. Such restructuring would be accomplished by a combination of massive sorts and processing routines. In this sense, each batch run would require separation of data into distinctly separate files, even though there may be a large amount of common data between these files.

The integrated data base approach involves setting up a network structure of data and, from this network, generating the local data structure needed by each application. With the integrated data base approach, a clean separation of data into distinct files is deliberately avoided so as to reduce the amount of data redundancy. The network structure of an integrated data base permits each application program to operate with its "own" view, i.e., its local or logical view of the data.

With each application retaining its "own" view, i.e., its logical view of the data, the application code will continue to operate regardless of what changes are made to the data files. Thus, with an integrated data base, a data name is stored only once, and all applications share this single, nonredundant data.

In an integrated data base, data occurs on at least three distinct levels:
1. external—The external level is data as presented on output reports, displays, etc. and therefore corresponds to the structure of data as it appears to a user at a terminal or a user reading a report printed by the system.
2. logical or LVIEW—The LVIEW is the data structure required to support a particular application and it is used to generate the external view.
3. associative model or view—The associative view is the data structure required by the system to generate the multiple logical or local views used by the various application programs. The associative model is synonymous with the internal file network or integrated data base structure.

The program process in accordance with the principles of the present invention operates upon the various LVIEWS of a multi-application computer system, and from the information contained within these LVIEWS themselves, acts to produce an integrated data base structure supportive of all the LVIEWS. In particular, the resultant integrated data base structure exhibits minimal data redundancy by reducing duplicate information common among the various LVIEWS, and does so in a manner such that each LVIEW appears to have its own data base or view.

Accordingly, a data base may be looked upon as comprising a mass of data occurrences with special structure or arrangement. The program process in accordance with the principles of the present invention is designed to automatically specify and arrange this special structure with minimal data redundancy. In this regard, a "data occurrence" may be defined as a specific instance of data from a group of data. A "data element" is the smallest, nondivisible data reference used. A "data element name" is the symbolic reference to all occurrences of that data element, and a "data element occurrence" is a specific value. For example, the data element name "ship date" may have a data element occurrence of "2 April 1974."

In this regard, it should be noted that there are two types of data elements recognized in accordance with the program process of the present invention. In particular, "keys" and "attributes" are recognized as having a specific meaning. A key is a data element whose occurrences are unique, whereas an attribute has value which is not necessarily unique. For example, if personnel data is being stored, the social security number could readily be made the "key" while age, weight, salary, etc. would most likely be "attributes."

A "segment," as defined herein, may be characterized as a group of data elements. Each segment occurrence is uniquely identified by a key. A key that consists of more than one data element is called a compound key. In this regard, if A, B and C form a compound key, then one may write (A*B*C).

As is evident, different segments or segment sets may be associated with each other. For example, a given segment set with NAME-A and whose key is KEY-A can be associated with another segment set with NAME-B and whose key is KEY-B. The collection of association instances between A and B may be defined as an association set and is minimally defined by KEY-A and KEY-B. As an example of a simple illustration, one may consider departments and employees. Each department can be uniquely represented by a segment whose KEY-A is department number, and each employee, can be uniquely represented by a segment whose KEY-B is EMPLOYEE#. Each department is associated with certain employeess, hence there is an association set containing the relationships of DEPT# to EMPLOYEE#. Each DEPT# has multiple EMPLOYEE#S associated with it. Notationally, the association may be written as (A,B) or DEPT#, EMPLOYEE#).

An association is a "from"-"to" relationship between two data elements; that is, one element may be characterized as the FROM element while the other element may be characterized as the TO element. Thus, an orientation is established between two elements by the FROM and TO designation. The FROM-TO relationship may be specified, as hereinabove indicated with respect to the EMPLOYEE#-DEPT# relationship, as (A,B): LABEL. The data elements A and B are the FROM and TO portions, respectively, (establishing direction) while the LABEL is an optional name that may be assigned to that association. In this regard, if A and B are KEY-A and KEY-B having more than one relationship, then the LABEL is used to distinguish the difference. Thus, it is possible to have, for example,:

(Sales Order, Division): SELL='1'

(Sales Order, Division): MFG='1'

(Sales Order, Division): SHIP='1'

The associative file or data base design process in accordance with the present embodiments recognizes three basic types of associations between data elements. It should be appreciated that when reference is made to associations between data elements, either key or attribute, the permutations and combinations are of enormous variety. The three basic types of associations may be enumerated as the '1' association, the 'M' association and the 'C' or conditional association. Given a data element name A and a data element name B, the three associations can be distinguished by writing:

$$(A,B) = \text{'1'}$$
$$(A,B) = \text{'M'} \text{ or } (A,B) = \left\{ \begin{array}{c} \text{'1'} \\ \text{'M'} \\ \text{'C'} \end{array} \right\}$$
$$(A,B) = \text{'C'}$$

The three basic types of associations may be more graphically depicted with reference to FIGS. 1B. FIG. 1B1 shows examples of '1' association between A and B. In such an association, each occurrence of the data element A has a single associated occurrence of the data element B. On the other hand, not every occurrence of data element B need be involved in the relationship. A simple example of a '1' association is the association (EMPLOYEE#, DEPT#)='1'.

In FIG. 1B2, examples of the 'M' association are depicted between elements A and B. In the 'M' association, each occurrence of the element A may have multiple occurrences of the element B. It should be noted that the number of multiple B occurrences can take on the values of 0,1,2,3 ... etc., so that there can be an A occurrence which has no B occurrences. A simple example of such an association is that previously noted, i.e., (DEPT#, EMPLOYEE#)='M'.

FIG. 1B3 depicts examples of the 'C' association between elements A and B. In such an association, not every occurrence of element A has a single occurrence of element B, but for those occurrences of element A that do, each of these occurrences of A has only one occurrence of element B. As a simple example of this association, consider (EMPLOYEE#, MANAGER#)='C'.

Additional information about two data elements may be obtained by combining both the forward and backward associations between these elements. The different association pairs obtained by such a process are called mappings of the elements. The significance of associations and mappings will be more fully appreciated when it is recognized that the local or LVIEWS, hereinabove mentioned, are to be defined and specified in terms of the described associations and mappings.

In the process, in accordance with the principles of the present invention, each LVIEW must be defined and specified using certain rules and constructs in order that the data may be meaningfully related in a consistent manner. Thus, each data element in the various LVIEWS must be linked with at least one other data element within its LVIEW according to one of the above-defined associations. In addition, the mappings of these elements, i.e., the forward and backward associations between pairs of elements, must be according to one of the following five mappings:

1:1 one to one or identity
1:M one to many
1:C subset
M:M many to many
C:M conditional to many Before defining further rules and constructs which must necessarily be followed to systematically define the various LVIEWS that are processed in accordance with the present invention to form the structure for an integrated data base, reference will be made to the directed graph of FIG. 1C to illustrate and define certain terms used in these rules and constructs. In the directed graph of FIG. 1C, each node represents data, whether it be a data element, segment, etc. A key is defined as any node in an overall graph of all LVIEWS that has one or more '1' associations leaving it. In addition, a key is a data element whose occurrence must be unique. In FIG. 1C, Nodes A, B, C, D, E and F are examples of a key. An attribute has previously been defined hereinabove as a data element whose occurrence is not necessarily unique. An attribute may further be defined as a terminal node, i.e., a node that has no '1' associations leaving it. In the directed graph of FIG. 1C, the attributes are the nodes labeled 1-10. A path may be defined as the enumeration of successive nodes through the graph. Thus, in FIG. 1C, a path from D to C to B to 3 may be depicted as D//C//B//3. An initial node may be defined as a node that has no '1' associations entering, but has one or more leaving. Examples of this are shown by nodes D, E and F in FIG. 1C. Finally, a level may be defined as the numerical number of nodes spanned in a path of '1' associations to reach a node from an initial node. Thus, the path to 3 above-mentioned, i.e. D//C//B//3, is at Level 4.

The various nodes representing data in FIG. 1C may be characterized in terms of the FROM element and TO element mentioned above in regard to associations. Thus, if a key is defined as any node that has one or more '1' associations leaving it, it may also be viewed as a data element that occurs as the FROM member in a '1' association to any other data element. Likewise, if an attribute is defined as a node that has no '1' associations leaving it, it may also be characterizd as a TO member or data element that never has a '1' association to another data element.

The various LVIEWS to be processed in accordance with the associative file or data base design method of the present invention are defined according to the following rules, in addition to the above-described association and mapping constructs. These rules may generally be defined as follows:

Every data element of an LVIEW must have at least one linkage to another data element.

All data elements must be a key or an attribute, and are classified in these two categories.

All attributes must have at least one key, i.e., another data element with a '1' association to it.

All 1:1 mappings are removed and one or the other data elements chosen as the primary identifier.

All M:M mappings are removed and reexpressed as a path between keys, i.e., for the A starting data element find the associated B data elements, and then for each B find the associated C data elements, etc.

All key to key linkages must be a mapping, i.e., the forward and inverse are both associations specified.

The C:M mapping is not permitted between keys and if it occurs, it must be replaced by a pair of 1:M and a 1:C mappings. p1 All key to attribute linkages must be either a 1:M or 1:C.

If a key to attribute mapping is C:M, it is considered to be a 1:M for the process and is flagged.

A pair of data elements cannot have more than one kind of linkage, i.e., (A,B)='1' and (A,B)='M' is not permitted. Either this is an error or an association label must be introduced.

The several steps shown in FIG. 1A represent the overall associative file or data base design process, as carried out by the digital computer in accordance with the principles of the present invention. As hereinabove mentioned, all of the local data views or LVIEWS of the various computer application programs to be processed into an integrated data base design structure are entered into the processing computer system storage in accordance with the above-defined constructs and rules. The process as generally depicted in FIG. 1A, and more particularly depicted in FIGS. 2–8, is driven by the collection of all associations, mapped in both the forward and reverse directions, from all LVIEWS specified by the user, after conformity with the defined constructs and rules has been made. Each association comprises four values, to wit, the FROM, the TO, the type of association ('1', 'M', or 'C'), and the association label. These values are stored in a stack called the list of associations (LOA). This stack or list is depicted in FIGS. 2B1 and 2B2 as the LOA table. As can be seen in FIG. 2B2, the values corresponding to each association are entered in the fields of the table according to the FROM, TO, LABEL, and type of association designations in the table. In addition, the table includes room for category flags (CF) and (CT), which are key designators, essential flags (EF). The purpose of the various values designated in the LOA Table will become more apparent with the detailed description of the operation as set forth in regard to FIGS. 2–8.

Generally, the overall operation, as can be seen with reference to FIG. 1A, involves first removing all similar associations appearing in the LOA Table as shown by Block 1. Similar associations in the LOA Table arise out of the fact that these same associations can appear in many LVIEWS. The multiple appearances of the same association are removed so that each association appears only once.

After all similar associations have been removed, the remaining associations in the LOA Table are processed to determine which entries involve associations which are key associations and which entries involve associations which are attributes. As shown in FIG. 1A, this step is designated by Block 3 calling for the separation of keys from attributes. To achieve this, each data element is taken one at a time. In this regard, it should be noted that a data element may appear in many places (e.g., the FROM or TO). For each data element, all entries in the LOA Table are scanned. If the data element X, for example, is found anywhere to occur in the FROM column with a type='1' association to any other data element, then X is known to be a key and the category flag (CF) for this element, as designated in FIG. 2B2, is set at K, i.e., CF='K'. If, when scanning all entries in the LOA Table, a data element V never appears in the FROM column with a type='1' association to another data element in the TO column, then Y is an attribute and the CF flag is set at A, i.e., CF='A'.

After the keys and attributes have been determined, as represented by Block 3 in FIG. 1A, the implied associations that exist in the relational aspect of the associated data are determined. This step is represented by Block 5.

An implied association may generally be defined as an association that may be deduced from two other associations having a common data element. Thus, if there are two associations in the LOA Table of type='1' such that:

(A,B):L1='1' and (B,C):L2='1' than there is an implied association (A,C):L1,L2='1'.

It can be seen from the above-implied association that the association labels (L1,L2, etc.) are collected sequentially. If the labels are blank, i.e., if, for example, L1=blank and L2=blank, then the collected label will also be blank. The labels of the implied association are collected because two keys are not always sufficient to uniquely identify an association. This can be seen by reference to the previous example hereinabove mentioned wherein two keys, KEY-A and KEY-B, had more than one relationship (Sales Order, Division) and the label was used to distinguish the difference between the relationships. Thus, two keys may have a multiple meaning association which is distinguished by utilizing the label. In order to avoid ambiguity for deducible or implied associations which are also multiple-meaning associations, the string of essential association labels are collected sequentially along the path needed to define the multiple-meaning association.

In order to generate the implied associations according to the general process step depicted by Block 5 in FIG. 1A, each entry in the LOA Table is scanned, one at a time. for any entry in the LOA Table of type='1', i.e., (X, Y):L1='1', the LOA Table is rescanned to find any other second association of the form (Y, Z):L2='1'.

For every pair of such associations, the implied association (X,Z):L1, L2='1' is entered into a stack called the implied association list, or IAL Table. FIG. 4A2 depicts a representation of such a table which table will be described in more detail with the ensuing description in regard to FIG. 4A. When such entries are made in the IAL Table, the TF designation, as shown in FIG. 4A2, is given a value 'S', i.e., TF='S'.

With all of the computed IAL entries made in the IAL Table, the IAL entries are, in turn, scanned, one at a time. The purpose in scanning here is to determine whether any further deducible associations exist among the calculated implied associations. Thus, for each (W,Z):L3 for which TF='S' (which must be a '1' association) in the IAL Table, the LOA Table is scanned, one entry at a time, to find any association of the form (Z,Q):L4='1'. If, during this LOA Table scanning process, a (Z,Q):L4='1' is found in the LOA Table, then the new entry (W,Q):L3, L4='1' is added to the IAL Table with TF set equal to 'S'. When the entire LOA table has been scanned and there are no more (Z,Q):L4 left, then the original (W,Z):L3 entry in the IAL Table is marked by setting the termination flag TF='T'. When the scanning process for the IAL entry in question is completed, it is repeated recursively until all IAL Table entries are set to TF='T', i.e., a complete scan of the IAL Table is made for which no LOA Table correspondences can be found.

After all implied associations are determined and entered into the IAL Table, the essential associations are calculated in accordance with the overall process step represented by Block 7 in FIG. 1A. To calculate or flag the essential associations, the LOA Table is scanned, one entry at a time, for all type='1' associations. If the LOA Table entry (A,B):L4,L5, ='1' can be found anywhere in the IAL Table, i.e., there is an IAL Table entry (A,B):L4,L5, . . . ='1', then the LOA entry is marked EF='N' or nonessential. If, on the other hand, there is no IAL Table entry (A,B):L4,L5='1', then the LOA entry is marked EF='E', i.e., essential. Thus, any association in the LOA Table which can be implied by any other associations is considered nonessential while any association which cannot be implied by other associations is considered essential.

After all entries in the LOA Table have been marked in the EF field with either an 'E' for essential or 'N' for nonessential, the various LVIEW data has been processed, in accordance with the present invention, to a point whereby a graph structure may be generated representative of the basic structure of the integrated data base. In this regard, all entries in the LOA Table for which EF='E' are the logical linkages which define the essential or basic structure of the integrated data base. This essential or basic structure can be presented to the data base designer in a variety of ways. For example, a graphical print-out depicting a network of keys and their attributes may be generated. Alternatively, a matrix of associations between keys may be produced. Or, a simple listing of the processed data in nongraphical form may be produced.

As can be seen with reference to Block 9 in FIG. 1A, in the embodiment described in accordance with the principles of the present invention, a graph structure in print-out form is generated. This graph structure, as implemented, is basically a hierarchical parent/child graph structure based upon "root" keys and their attributes. The routines shown in FIGS. 6A and 6B calculate the root keys and determine the parent/child relationships. The routine shown in FIGS. 7 operates to generate a rudimentary parent/child graph or network, thereby illustrating one approach to obtaining a graphic output of the integrated data base design, in accordance with the process of the present invention. Other approaches may readily be implemented by those skilled in the art.

In FIGS. 2A and 2B, Module 1—Step 1 and Module 1—Step 2, respectively, comprise a breakdown of the routines required to carry out the step depicted by Block 1 in FIG. 1A. In FIG. 2A, Module 1—Step 1 shown therein receives the input data representing the LVIEWS (local views) described by the designer at Block 11 and creates a file of these collected LVIEWS. Each LVIEW may be coded on a group of cards, although other input mechanisms are possible. The first card of an LVIEW gives a name for the LVIEW and other appropriate data such as the name of the application program using the LVIEW, how often the application program is run (daily, weekly, on-line), and the intensity of usage (transactions per second for on-line or number of passes in a batch run).

The flow chart in FIG. 2A further depicts at Block 13 the step of reading the input cards and printing these out, one at a time. Each card is checked for errors, depending on the particular format used in Block 15. For example, if the card format of a conventional punched card requires a FROM data name in Col. 5–25, a TO data name in Col. 26–46, and an association type in Col. 50, then some typical examples of these errors are:

(a) Is there an acceptable character in Column 3 and 25, followed by a string of characters without more than one imbedded blank? This will check whether the column alignment is correct and each data name follows any rules such as no more than one embedded blank.

(b) Is Col. 50 a "1" or "M" or "C"? Any other entry is an error.

(c) All other columns that have no entry must be blank.

When a header card is encountered at the process point represented by Block 17, then a new LVIEW is being started and the previous LVIEW, if there is any, can be checked for errors within an LVIEW as represented by Block 19. This type of checking depends on the format being used, as hereinabove suggested. The header card itself need not be kept and may be discarded. With a header card being encountered, the routine returns to Block 13 via Block 21. All other LVIEW cards that describe an association are then processed via Blocks 13–17 and are stored, in response to Store Instruction 20, in the file SORTIN, as represented by Block 23.

The file SORTIN is then sorted (via the step represented by Block 25) by the FROM data name, the TO data name and the association Label and Type. The sorted data is then placed in another file SORTOUT, represented by Block 27. FIG. 2B2 represents the field of sorted data in the "SORTOUT" file.

The appended PL/I code accomplishes the steps shown in FIG. 2A in Lines 1–54. Statements 1–13 of the code declare the variables to be used, such as the card format (line 5), the LOA structure (Line 6), the IAL structure (Line 7) and the various files needed (Lines 8–10). The variable JRP of Line 12 is used to count the number of non-header cards. The error check step of Block 15 in FIG. 2A is shown by the code of Lines 24–28. Block 17 of FIG. 2A, which determines header and non-header cards, is shown by the code of Lines 30–40. The actual sort of Block 23 is shown in the code of lines 48–49. The decision of Block 21 is done with the DO loop of Lines 19–41 and end of file is done by Line 21.

In FIG. 2B, Module 1—Step 2 shown therein reads the SORTOUT file represented by Block 27 in FIGS. 2A and 2B, and eliminates multiple occurrences of the same association. The result is stored in the table LOA depicted in FIG. 2B1. The LOA table has been previously allocated, as shown by Line 49 of the appended code and Block 29 in FIG. 2B, to contain an entry for all SORTOUT records which were counted by the variable JRP and an extra dummy space, i.e., LOA has JRP+1 entries as shown in FIG. 2B1. Block 29 of FIG. 2B represents the allocation for creation of a JRP+1 entries table. A pointer to LOA is set to zero as shown by Line 56 of the code.

Each record in SORTOUT, as represented by Block 31 in FIG. 2B and FIG. 2B2, is read one at a time into the last LOA dummy entry LOA (JRP+1) via the instruction of Block 33 of FIG. 2B and Line 58 of the appended code. The DO loop of Lines 57–75 of the code represents the reading of all SORTOUT records, or JRP "reads." The first record, when JR=1 on Line 62 of the code or Block 35 of FIG. 2B, automatically moves the first record to the first LOA entry, as shown by Lines 59–62 of the code and Block 37 of FIG. 2B. If the record is not first, i.e., JR>1, then the new record is tested as shown by Block 39 to see if its contents are the same as or different from the preceding records which is at position JR. If the new record is different (as shown by decision Block 41) because the FROM or TO or association type or label is different, then the new record is stored (as shown by instruction Block 43) as the next available slot in LOA which is JPOS+1. The JPOS is then incremented by one as shown by Block 45. The comparison operation of Block 39 corresponds to the appended code of Line 70. The instruction of Block 43 corresponds to the code of Line 71 and the instruction of Block 45 corresponds to the code of Line 72. The "anymore records" query of Block 47, as shown in FIG. 2B, is part of the DO loop shown in the appended code at Lines 57–75. In the print-out instruction shown by Block 51, the print-out of the LOA table is by a call to a subroutine PRINTLOA shown in Line 77 of the appended code. Note that the final size of the LOA table is given by the final value of JPOS on Line 72 of the code.

Figure 3C:
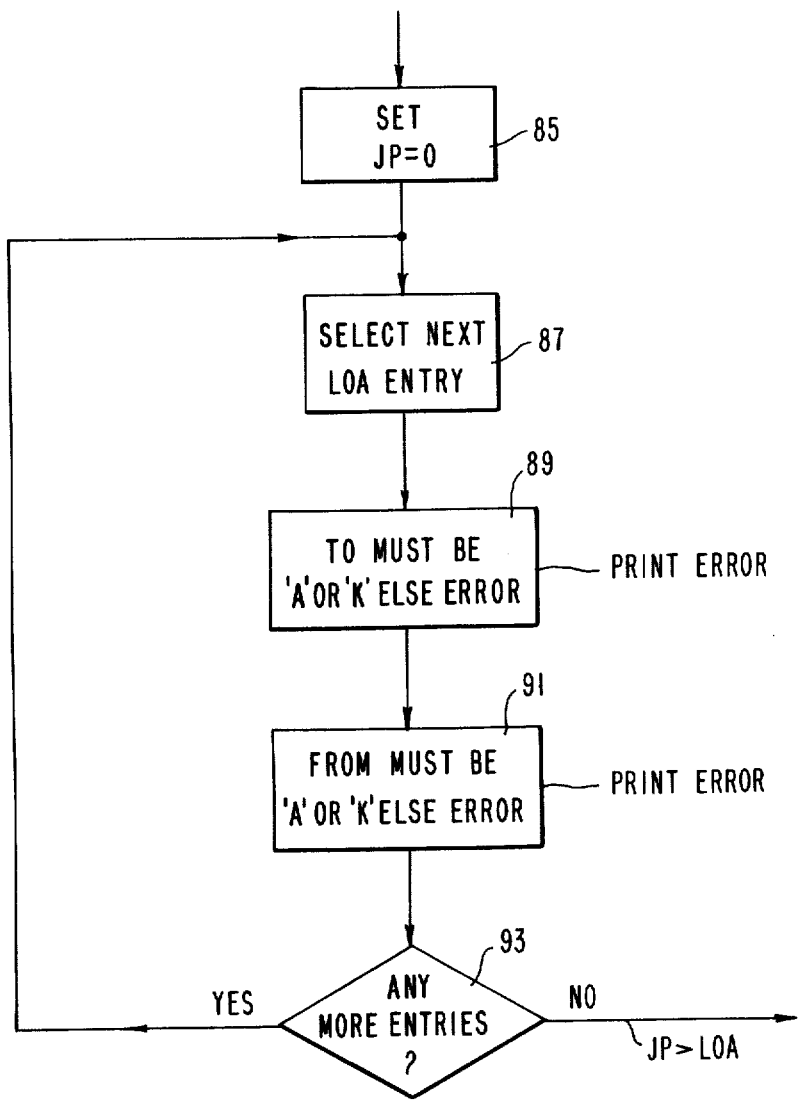

The routines shown in FIGS. 3A, 3B and 3C act to classify the various nodes listed in the LOA into keys and attributes. This is done by finding all keys first. A key is found by finding any node that has a "1" association leaving it.

As shown in FIG. 3A1, the LOA table is given two pointers, JP and JPOS. The size of the LOA table is JLOA which is given the value of the last JPOS on Line 72 of the appended code, thereby freeing JPOS for use in this run. The first pointer JP is used to scan the LOA entries one at a time by means of the DO loop on Lines 80 through 99 of the appended code. This sequential scan corresponds to Blocks 53, 55 and 59 shown in Module 2—Step 1 of FIG. 3A.

For each LOA entry found in this primary scan, the association is tested to see if it is a "1." This test is represented by Block 57 of FIG. 3A and Line 81 of the appended code. If it is a "1" association, then the FROM is a key and other secondary scan of LOA is done with the DO loop of Lines 82 through 98 of the code. This corresponds to Blocks 59–67 of FIG. 3A. Each LOA entry is examined one at a time in this secondary scan to see what the CF and CT flags (as shown in FIG. 2B2) are set to. The FROM data element name of the primary scan is a key, and the FROM and TO of the secondary scan are set to "K" if it is a blank, or an error is generated if something other than a "K" is in it. This operation is shown at Blocks 63 and 65 in FIG. 3A and corresponds to Lines 83–96 of the appended code.

When both primary and secondary scans are completed, then all data element names that are keys have been marked with a "K." For the FROM data element names, the CF field is set to "K" while for the TO data element names, the CT field is set to "K."

Step 2 of Module 2, as shown in FIG. 3B, acts to determine all attributes and marks them as an "A" in the LOA fields CF and CT, as shown in FIG. 2B2. This process is quite similar to the process of Step 1 of Module 2 shown in FIG. 2A.

The primary scan is performed by the DO loop of Lines 100 through 115 of the appended code, using the pointer JP with pointer JPOS. With JP=$\phi$, as represented by Block 69, an instruction is made to select the next LOA entry as represented by Block 71. If an LOA entry is found where the CT is unmarked and the FROM is a key (CF="K") and it is a "1" association, then the secondary scan is begun. This is shown at Block 73 in FIG. 3B or Line 104 of the code. First, the primary scan (unmarked CT) TO data name is marked as an attribute, or CT="A." This is shown be Line 102 of the appended code and Block 75 of FIG. 3B. Then, the secondary scan is started with DO loop on lines 103–113 of the code to test each FROM and TO to see if it is the same as the newly found attribute which is TO(JP). This is shown by the step depicted in Block 77 of FIG. 3B wherein an instruction is given to set JPOS=$\phi$. If any are the same, i.e., any TO (JPOS)-=TO (JP) and CT is blank, then CT (JPOS)="A" and is marked as such. This corresponds to Line 105 of the appended code. If, however, CT is marked here with anything other than CT="A" an error is generated. These steps are shown by Block 79 of FIG. 3B and Lines 106 to 109 of the appended code. All other occurences of this attribute are also marked as "A" as shown by Block 81 of FIG. 3B and lines 110 and 111 of the appended code. Block 83 returns the process to the beginning.

FIG. 3C depicts Step 3 of Module 2 wherein a routine is provided to check the LOA to verify that there is no residue, i.e., all FROM and all TO LOA data entries have been marked as either "K" or "A." The main DO loop of lines 116–125 of the appended code performs the scan operation required here to test each LOA entry and each entry in LOA is tested. If any entry has anything other than "A" or "K" for the CF and CT fields, an error is printed.

Blocks 85 and 87 in FIG. 3C initiate the loop to check for unmarked FROM and TO entries. The TO entries are checked by the operation depicted by Block 89 which corresponds to the appended program code of Lines 117–120 and the FROM entries are checked by the operation depicted by Block 91 which corresponds to the appended program code of Lines 121–124. Block 93 represents the DO loop.

Figure 4B:
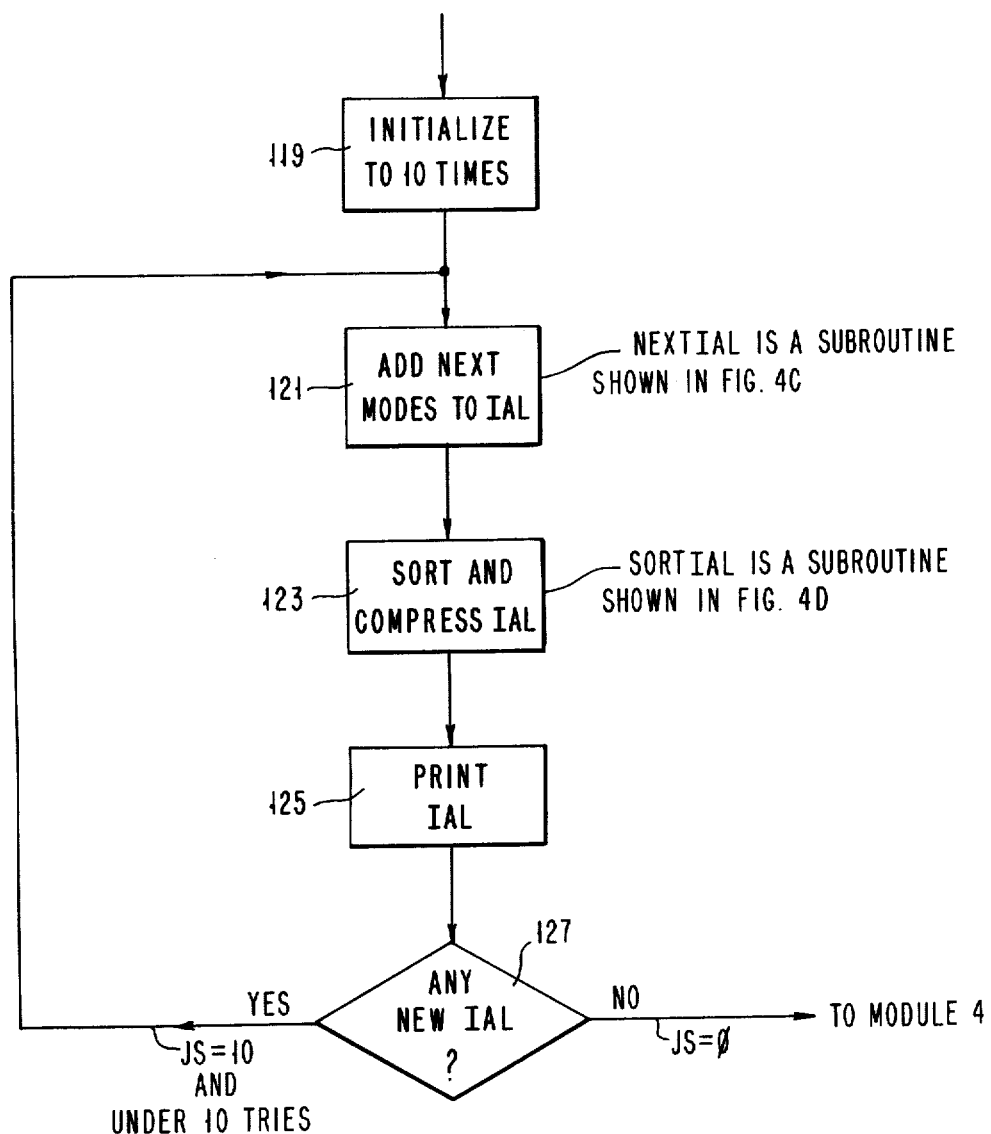
Figure 9:
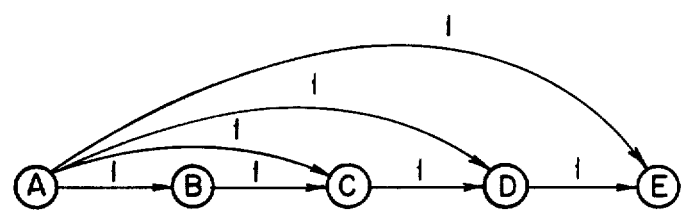
FIG. 9 shows a chart setting forth an example of implied associations according to the method of the present invention.

Module 3, as shown in FIGS. 4A and 4B, operates to determine the implied associations using the LOA table and the IAL (implied association list) table of FIGS. 4A1 and 4A2. The operation shown in these figures corresponds to the operation depicted by Block 5 in FIG. 1A. The computation is to find any case for which: (X,Y):L1="1" and (Y,Z):L2="L". The existence of the pair of "1" associations will act to cause the association (X,Z)L1,L2="1" to be stored in the next available IAL slot of the IAL table. Effectively, the computation finds paths through "1" associations of increasing length of span. For example, suppose we have the case in the chart shown in FIG. 9;

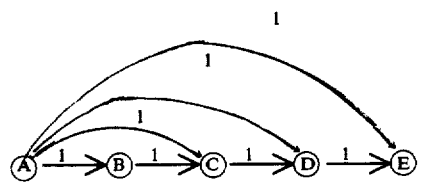

the first iteration will produce (A,C)="1," the second iteration (A,D)="1," the third (A,E)="1" until no further connections occur. As can be seen from FIGS. 4A and FIGS. 4B, the overall computation has been broken into 2-general steps;

Step 1: Initialize the IAL table by finding 3 node spans. This corresponds to the (A,C)="1" computation described above and Step 2: Using the IAL initialized results, all additional paths are found recursively until no further extensions are found.

The flow chart of Module 3, Step 1 corresponds to Lines 133–163 of the appended code. The primary scan of the LOA table, as depicted in FIG. 4A1, is carried out by the DO loop in code Lines 133 and 163, whose pointer is JF. This primary scan loop is preformed via the steps depicted by Blocks 95, 97 and 113. As can be seen, Block 95 initializes the IAL counter JP for scan of the LOA table. Each entry in the LOA table is examined, one at a time, via this loop process. If an entry has a "1" association, a secondary scan is started. The secondary scan is initiated by a "yes" response to the query represented in Block 99 which corresponds to the code of Line 134 in the code appended.

The secondary scan of the LOA table is carried out by the DO loop in Line 135 and 161 of the appended code. The secondary scanning variable is JT. If the primary TO value, TO(JF), is equal to the secondary FROM, FROM(JT), then an extending "1" association has been found if the secondary association is a "1," TYPEL(JT)="1." This operation is carried out by the operation depicted by Block 105 in FIG. 4A and Line 136 of the appended code.

Each extension that is found is then checked to detect for a loop. Block 170 in FIG. 4A depicts this operation. If there is a loop, then the extension is the same as the entry, of FROM(JF)=TO(JT). The query of Lines 137 to 140 of the appended code detects for a loop and generates a diagnostic as shown in Block 107. If there is no loop, then the DO loop of Lines 141 to 159 of the code is entered, because FROM(JF)≠TO(JT). The new association is entered into the IAL. These operations are depicted more particularly by Block 109 in FIG. 4A.

The FROM and TO values are entered in the IAL table as IAL.F and IAL.T in the next available position (KP+1) at Block 109. KP is a pointer to the last entry in the IAL. This is done on Lines 142-143 of the appended code. The next computation, as represented by Block 109, is to add the association labels to IAL.A (KP+1). If either the primary or secondary "1" association has a label, then it will be entered in the order of primary, and then secondary. If neither has a label, then IAL.A (KP+1) is left blank. The primary label is Lines 145 to 148 of the appended code while the secondary label is Lines 149 to 152 of this code. The final collected label STR3 is entered into the IAL.A(KP+1) on Line 153 of the code. Then KP pointer is moved up by one as shown at Line 154 of the code and Block 111 of FIG. 4A.

The IAL size is checked on line 155-158 of the code to see if the size allocated is too short. If it is, the allocation must be changed and the entire program rerun. Blocks 113 and 115 act to return operation to either the primary scan loop or secondary scan loop according to the decision paths shown.

Finally, after all the required iterations, the IAL table contains all first extensions found in LOA, i.e., any (X,Y):1="1" and (Y,Z):LZ="1" results in (X,Z):L1,L2="1" in the IAL. The IAL may be printed, if desired, as represented by Block 117.

In FIG. 4B, Module 3—Step 2 acts to recursively complete the computation of the IAL table. The basic result is still to find any case for which: (X,Y):L1="1" and (Y,Z):LZ="1". This causes another IAL entry (X,Z):L1,L2="1" to be made. This stage of the overall process corresponds to the DO loop on Lines 166 through 171 of the appended code. The DO loop has been set up to repeat 10 times, since no path greater than 10 nodes normally occurs. When a complete scan of the IAL table has occurred for which no further extensions are found, then the main DO loop on Lines 166 through 171 is ended by setting the DO loop variable IT=30. This forces ending the recursion. This is shown by Block 119 and 127 in FIG. 4B.

The DO loop in question will call subroutine NEXTIAL as shown by Line 167 of the appended code and Block 121 in FIG. 4B. Subroutine NEXTIAL will be explained in more detail in FIG. 4C. This subroutine acts to extend the path one node. As shown by Block 121, the IAL is sorted with subroutine SORTIAL on each recursion of the DO loop to order the IAL for the next computation. Subroutine SORTIAL will be explained in more detail in FIG. 4D.

Figure 4C:
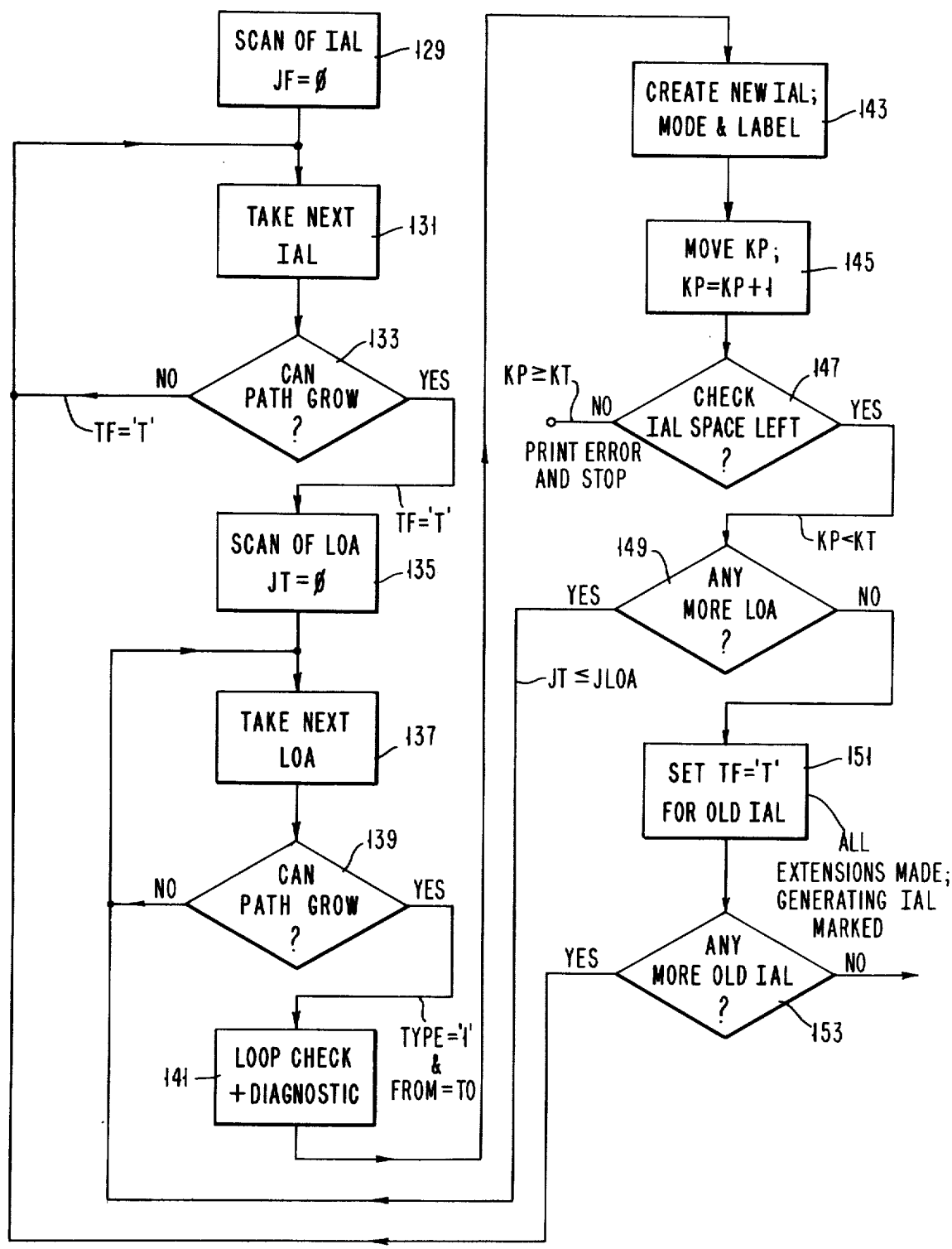
FIG. 4C depicts a flow chart which is a further more detailed way in which the step represented by Block 121 of the flow charted routine of FIG. 4B may be carried out.

In FIG. 4C, there is shown subroutine NEXTIAL correpsonding to Block 121 in FIG. 4B.

This subroutine is similar to the initialization of the IAL routine of FIG. 4A except that the primary scan is an IAL scan with variable JF. The primary IAL scan corresponds to the DO loop on Line 375-Line 413 of the appended code. By this routine, each entry has the IAL.IF set (with a termination flag) whenever an entry cannot be extended. After initialization, no TF flag has been set. There are some other variables used for this primary scan:

(a) After each calculation of initialization or NEXTIAL, the pointer KP is set to the last IAL entry. The next iteration remembers this count by setting KX=KP on Line 376 of the appended code. New IAL entries are entered beyond the KX position by incrementing KP.

(b) The variable JS is set to zero before each NEXTIAL computation. If any new etension is found, JS is set equal to 10 in Line 387 of the code so that recursive DO loop on Lines 166-171 of the code can be ended with Line 171.

(c) The TF flag is set to "T" if any old TAL cannot be extended. (See Line 411 of the appended code and Block 151 of FIG. 4C.)

If all IAL.TF entries are found to be "T" as shown by Line 379 of the appended code, then JS remains at $\phi$.

If TF is not set, then that IAL entry is tested for extension, as indicated by Block 133 of FIG. 4C and Line 379 of the code.

The secondary scan of FIG. 4C is started if an IAL.TF≠"T" is found at the decision point represented by Block 133. Primary scanning of the IAL is initiated by Blocks 129 and 131. The secondary scan is on the LOA, using the DO loop of Lines 380-409 of the code as shown by Blocks 135, 137 and 153. For each IAL entry from the primary scan which can be extended, a loop test is made according to Lines 382-385 of the appended code. A loop test is made after a secondary scan extension test is made according to the code of Line 381 of the appended code and the operation of Block 139. If a loop is found at Block 141, an error is generated.

If there is no loop, as determined by Block 141 in FIG. 4C, then a new IAL entry is entered at the next available empty IAL slot, (KP+1). This is effected by the DO loop on Lines 386-407 of the appended code corresponding to Blocks 143, 145 and 153 of FIG. 4C. If a new IAL is being formed, this is remembered by setting JS=10 on Line 385 of the appended code. The new IAL.F(KP+1) and IAL.T(KP+1) are handled on Lines 388, 389 and 390 of the code. The new label to be entered is handled on Lines 391-400 of the code and the pointer KP is incremented to the current slot (KP+1) on Line 401 of the code.

If the pointer KP>KT, then the IAL table has run out of space and an error is generated. The IAL space must be increased and the entire program rerun. This is carried out by Lines 402-406 of the code and Block 147 of FIG. 4C.

Figure 4D:
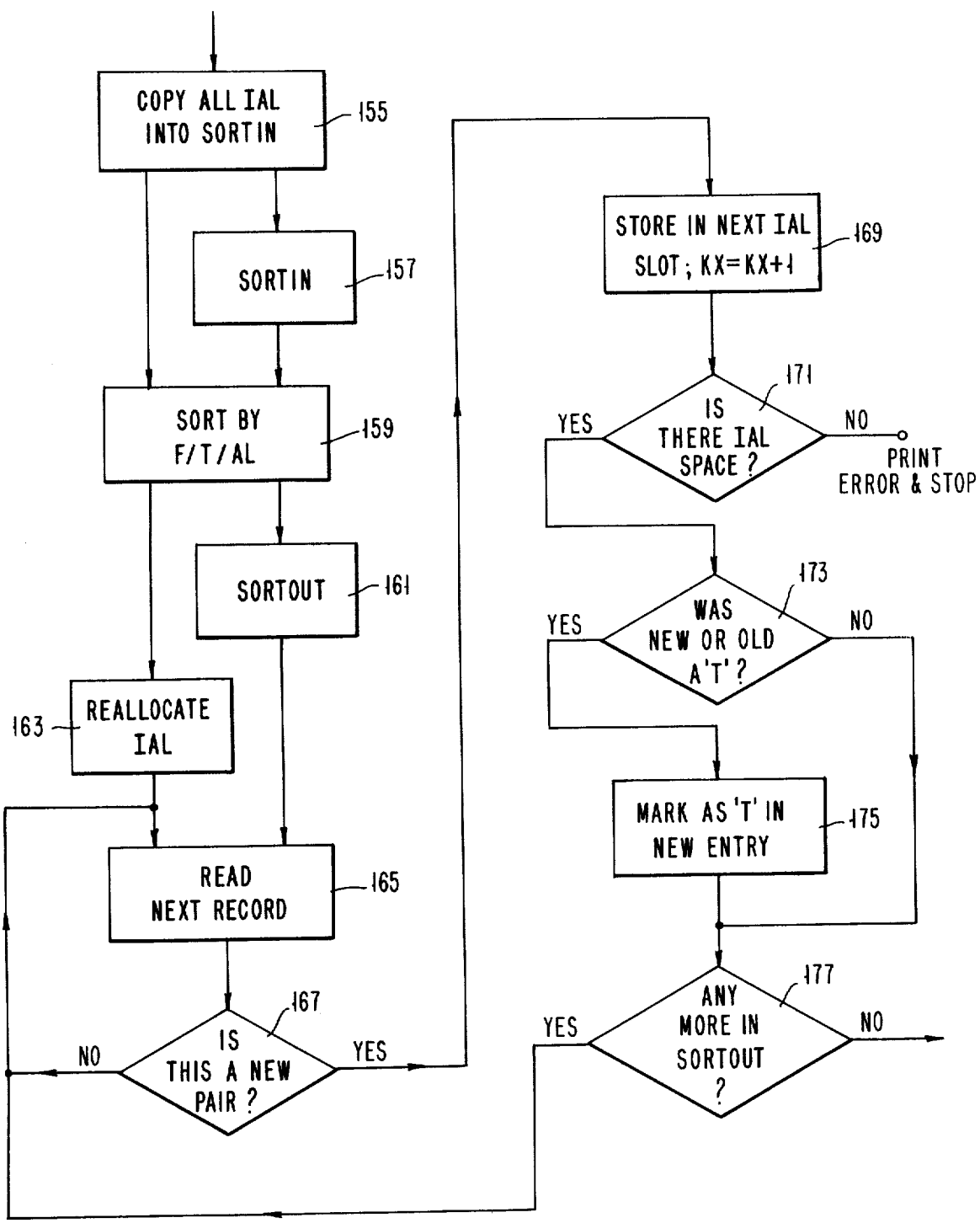
FIG. 4D depicts a flow chart representing a further more detailed way in which the step represented by Block 123 of the flow-charted routine of FIG. 4B may be carried out.

The subroutine SORTIAL, represented by Block 123 in FIG. 4B is shown in detail in FIG. 4D and corresponds to Lines 340-374 of the appended code. Basically, the subroutine carries out these operations:

(a) copies all IAL entries into a file called SORTIN.
(b) invokes a standard sort program which leaves the sorted answer in a file SORTOUT.
(c) The SORTOUT file is read into a reallocated IAL. Duplicates are removed.

The subroutine of FIG. 4C first copies all IAL into a file called SORTIN, as shown by Blocks 155 and 157, in accordance with the instructions of Lines 341-345 of the appended code. The subroutine next invokes a standard sort program, as represented by Block 159, to sort SORTIN file in Block 159 by the FROM/TO/association labels of the IAL file entries. This is achieved by the instructions of Lines 346-347 of the appended code. The results of the sort operation are read to a file SORTOUT represented by Block 161 in FIG. 4D.

The SORTOUT file represented by Block 161 is then read into a reallocated IAL file according to the instructions represented by Block 163 in FIG. 4D. In Line 349 of the appended code, the old IAL is discarded and in Line 350 a new IAL size is calculated as twenty times the preceding size, i.e., KT=20*KP. It should be noted that KT was the preceding IAL size. The new IAL allocation and clearing to blanks is carried out by Lines 351-352 of the code.

Next, the SORTOUT file is read, via the instruction of Block 165, into the last IAL entry, one at a time. This is done by the DO loop of Lines 354-371 of the appended code, which DO loop has a variable JF. When JF=1 the first record is being read, and when JF>1 all others are being read in. Two strings, STR1 and STR2, are both cleared. This is achieved by the instructions of Lines 356 and 357 of the appended code. STR1 is set equal to the last entry for any record on Line 358 of the code. If JF=1 (first record), then STR2 is set equal to the last or preceding record in accordance with Lines 359-360 of the code.

For the first record STR1≠STR2, since STR2 is still cleared. For any other record, then STR1≠STR2 if the new entry is different from the preceding. When STR1≠STR2, the record read into the last IAL position on Line 355 of the appended code is then placed into the next available IAL slot, which is (KX+1). This operation corresponds to Blocks 167 and 169 in FIG. 4D and the instructions of Lines 361-369 of the appended code.

If IAL file space is overrun, then KX>KT. This test is made by Lines 364-368 of the code and corresponds to Block 171 in FIG. 4D. If KX>KT, then an error is generated and the operation is stopped.

Finally, it should be noted that if the new entry and the old entry are the same, but the new entry is marked with termination flag TF="T," then the new entry is discarded and the old one is marked as "T." This operation corresponds to the instruction of Line 370 of the code and is represented by Blocks 173 and 175 in FIG. 4D. Effectively, if any similar entries, out of a group of entries which are the same, has been found to be nonextendible, then the single entry, after duplicates are removed, is also marked as "T." This acts to save computation.

After checking to determine if there are any more entries in SORTOUT file via the instruction represented by Block 177, the subroutine SORTIAL is over and as a result the IAL table has been set up with all extended paths in sort order. The variable KX is the next empty IAL slot. On Line 372 of the appended code, the last IAL size is saved for the next recursion by setting KP=KX.

Figure 5:
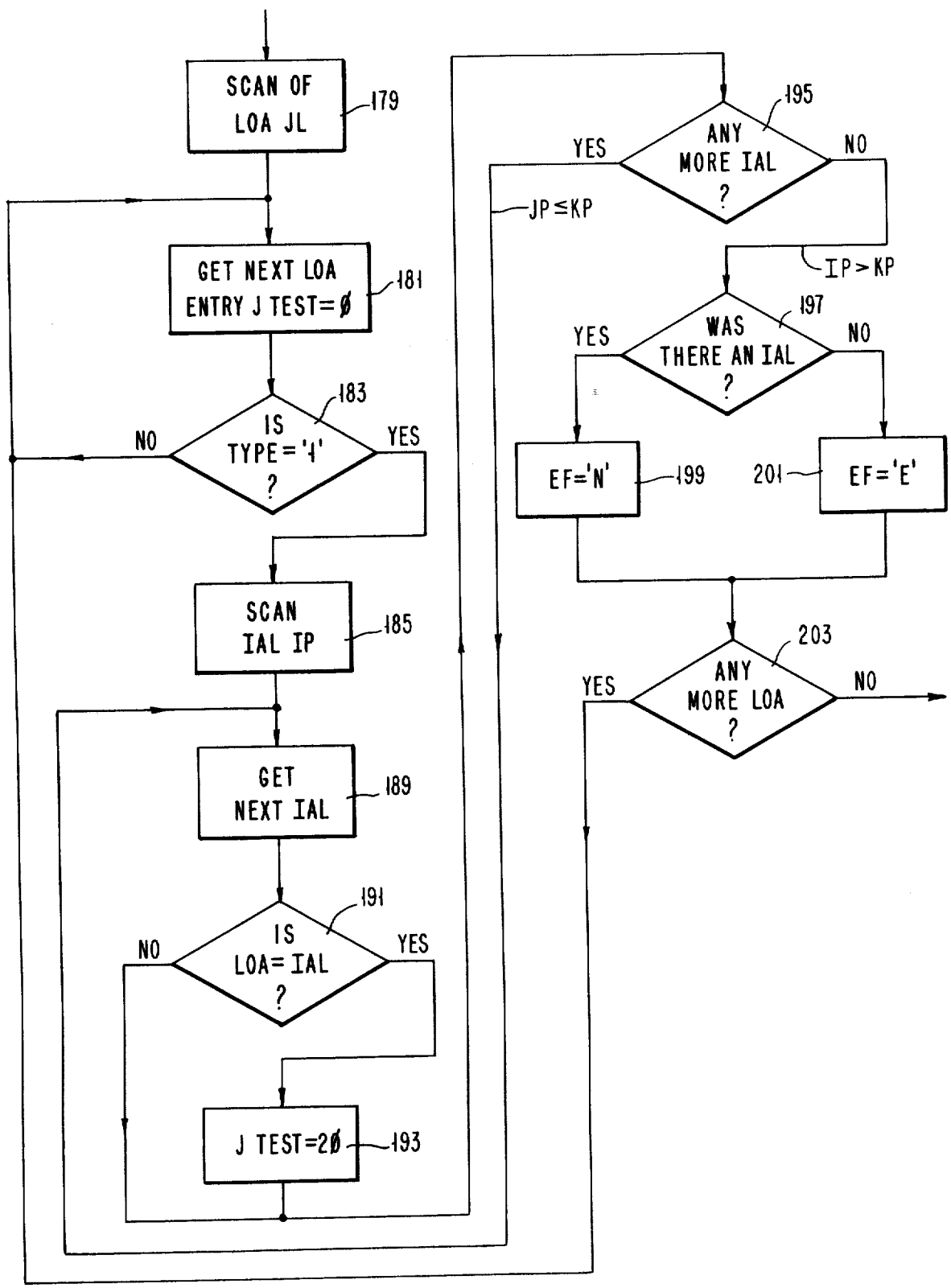
FIG. 5 depicts a flow chart representing a more detailed way in which the general step represented by Block 7 of the overall process of FIG. 1A may be carried out.

Module 4, shown in FIG. 5, corresponds to the operation or step shown by Block 7 in FIG. 1A. As previously indicated, this operation acts to flag or calculate the essential associations in the LOA and then marks them in the LOA by setting LOA.EF="E." As hereinabove indicated, an essential association is a "1" type association. A primary scan is made of LOA and for each LOA entry a secondary scan of IAL is also made. Any LOA entry which is a "1" association and cannot be found in the IAL is marked essential "E." The primary scan of LOA is the DO loop of Lines 172-186 of the appended code with a designated variable JL. The primary scan is carried out via the operations or steps depicted by Blocks 179, 181 and 199 of FIG. 5. Each time a new LOA entry is obtained, the testing variable JTEST=0 of Line 173 of the appended code is made, as shown by Block 181. If the current LOA entlry is a "1," then the secondary scan DO loop of the code shown by Lines 175-181 of the appended code is entered into. This operation is shown by Block 183.

The secondary scan of the IAL is achieved by the overall DO loop of Lines 175-181 of the code, using variable IP, as shown by Blocks 185, 189 and 195 in FIG. 5. In a manner akin to that previously described, two strings, STR1 and STR2, are both cleared. STR1 is set to the current LOA entry shown by Line 178 of the appended code. STR2 is set to the current IAL entry shown by Line 179 the code. If both strings are ever the same during the IAL scan, then JTEST=20; otherwise JTEST=φ. This is represented by Blocks 191 and 193 in FIG. 5.

After the IAL scan, (completed on Line 181 of the appended code) if no IAL entry has been found matching the current LOA entry at Block 191, then the LOA.EF entry is essential. This is shown by Line 183 of the appended code. On the other hand, if an IAL entry has been found which matches, then JTEST=20 as shown by Block 193, and the LOA.EF is marked "N" or non-essential via the operations represented by Blocks 195, 197 and 199. If the LOA entry was not a "1," then it is marked "N" also. This corresponds to the appended code at Line 185 Otherwise, the entry is marked essential or "E," as represented by Block 201. The operation is completed by the step represented by Block 203.

Before discussing the process disclosed with regard to Module 6 (FIG. 7) for generating a graph structure of the resultant data base with minimum data redundancy, as represented by Block 9 in FIG. 1, two additional steps will be described. These steps are shown as Module 5 in FIGS. 6A and 6B. In the first step shown in FIG. 6A, a process is shown which selects root keys. A triple scan of LOA is involved using three DO loops. Each root key is marked as "R" using the LOA.CT and LOA.CF flags described with regard to FIG. 2.

The primary scan of LOA is the DO loop on Line 188 203 of the appended code using the variable JP. The primary scan DO loop is carried out by the operation shown by Blocks 205, 207 and 233 in FIG. 6A. Each LOA entry is tested, one at a time, to see if the FROM node is a key as carried out by Block 20 and the code on Line 189 of the appendix. If any is a key, then a test variable JCNT is set to zero as shown by Block 211 in FIG. 6A and Line 190 of the appended code, and a secondary scan of LOA is begun with the DO loop of Lines 191-195 of the appended code. The secondary scan operation is carried out using the operations represented by Blocks 213, 215, and 221 and the variable JPOS.

Figure 6A:
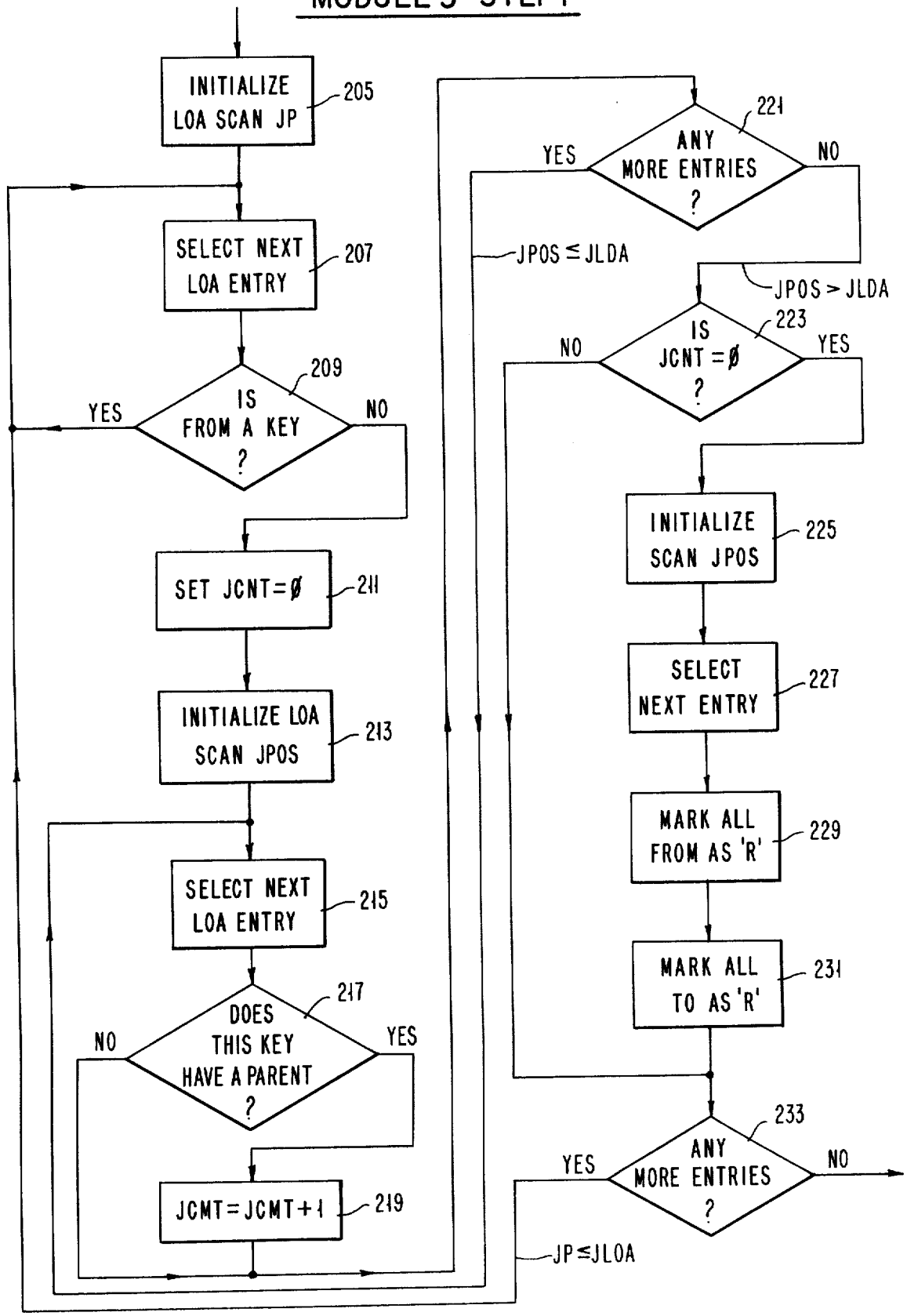
FIGS. 6A and 6B depict flow charts representing a detailed matter in which the data processed in accordance with Blocks 1–7 in FIG. 1A is further processed in preparation of the generation of a graph structure, in accordance with the step represented by Block 9 in FIG. 1A.

The secondary scan in FIG. 6A reexamines LOA, one entry at a time, to see if the FROM node from the primary scan, LOA.FROM(JP), has any essential associations to another key. This is the test shown by Block 217 and is carried out by Line 192 of the appended code. If there is an essential association to another key, then the test variable JCNT is incremented by +1. When the secondary scan of LOA as carried out here is completed, if JCNT=φ, then no essential associations to another key have been found, and the original LOA.-FROM(JP) is a root key. This latter test is carried out by Line 196 of the appended code and is represented by Block 223 in FIG. 6A.

If LOA.FROM(JP) is a root key, then another secondary scan of LOA is made to mark all identical nodes as a root "R." This latter secondary scan is the DO loop of Lines 197-200 of the appended code, and is represented by the operations depicted in Blocks 225 and 227 in FIG. 6A. All FROM and T0 occurrences are marked as "R" with the LOA.CF and LOA.CT flags, as shown by Blocks 229 and 231 of FIG. 6A and Lines 198 and 199 of the appended code. When all scans of LOA are completed, as determined by the operation represented by Block 233, then all root keys have been marked as "R."

Figure 6B:
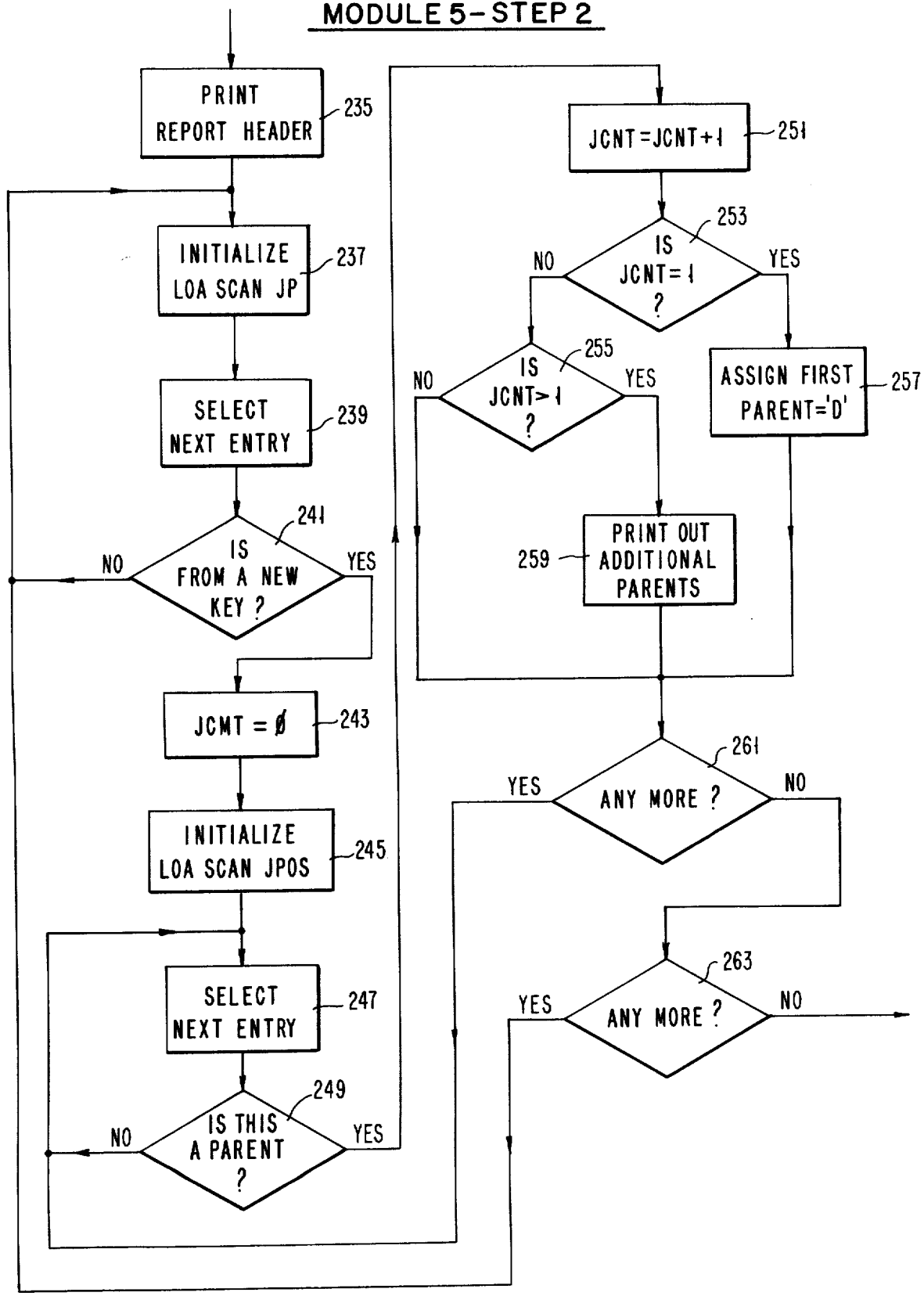

Step 2 of Module 5, as shown in FIG. 6B, assigns a dominant parent to every test key, even those that have 2 or more parents, and corresponds to the selection of a physical parent in IMS. The disclosed version, as shown in FIG. 6B and the appended code, does not show a sophisticated algorithmic selection process, since the operations involved for a sophisticated algorithmic selection could use straightforward state-of-the-art programming techniques. For example, at Line 214 of the code, instead of arbitrarily assigning the first parent as the dominant parent to the test key, an algorithmic selection could be coded to select the parent with the following criteria:

(a) Select any parent the analyst has specified, overriding all subsequent criteria.
(b) If (a) has not occurred, and the test key is a compound key, then a parent is selected which is a member of the compound. For example, if the test key is A*B, which means Key A and Key B combined, then the selected parent will be A or B.
(c) If (a) or (b) does not occur, then the usage or weight of each parent to the test key is examined, and the parent with highest activity is selected.
(d) If (a), (b) and (c) has not occurred, then select any parent.

The operation of Step 2 of Module 5 as coded involves a double scan of LOA. The primary scan is carried out by the DO loop of Lines 207-228 of the appended code with assigned variable JP. Blocks 235, 239 and 263 in FIG. 6B represent the operations that carry out the primary scan. The primary scan is preceded by a report title as carried out by Lines 204 and 205 of the appended code and Block 235 of FIG. 6A. The primary scan selects the test key LOA.FROM(JP), one at a time.

For each LOA entry on the primary scan, a test is made to see if this is a new key (nonroot) relative to the preceding entry. This test is shown at Line 208 of the appended code and is represented by Block 241 in FIG. 6B. If it is a new key, then STR1 is assigned the old nonroot key for subsequent testing, and a test variable JCNT is set to zero. This is shown by Lines 209 and 210 of the code and Block 243 in FIG. 6B. Then a secondary scan of LOA is started using the variable JPOS. This is the DO loop of Line 211-226 of the appended code and is represented by Blocks 245, 247 and 261 in FIG. 6B.

Within this secondary scan, the test key LOA.FROM(JP) is used to find any essential associations to another key or root. This is shown by Block 249 in FIG. 6B and is carried out by Line 212 of the appended code. If there is an essential association here, then JCNT is incremented with +1, as shown by Line 213 of the code and Block 251 in FIG. 6B. When JCNT=1, the first parent, the dominant parent, is arbitrarily selected as that one by marking EF(JPOS)="D." This is achieved by Line 214 of the appended code and is represented by Block 257 in FIG. 6B. If the JCNT=1, as determined by Block 255 in FIG. 6B, then these additional parents are printed out according to Lines 216-223 of the appended code and Block 259.

At the end of this computation, every key that is a nonroot key has been assigned a dominant key as its parent. In other words, every nonroot key has a selected essential association marked as "D" which is called its parent.

Figure 7:
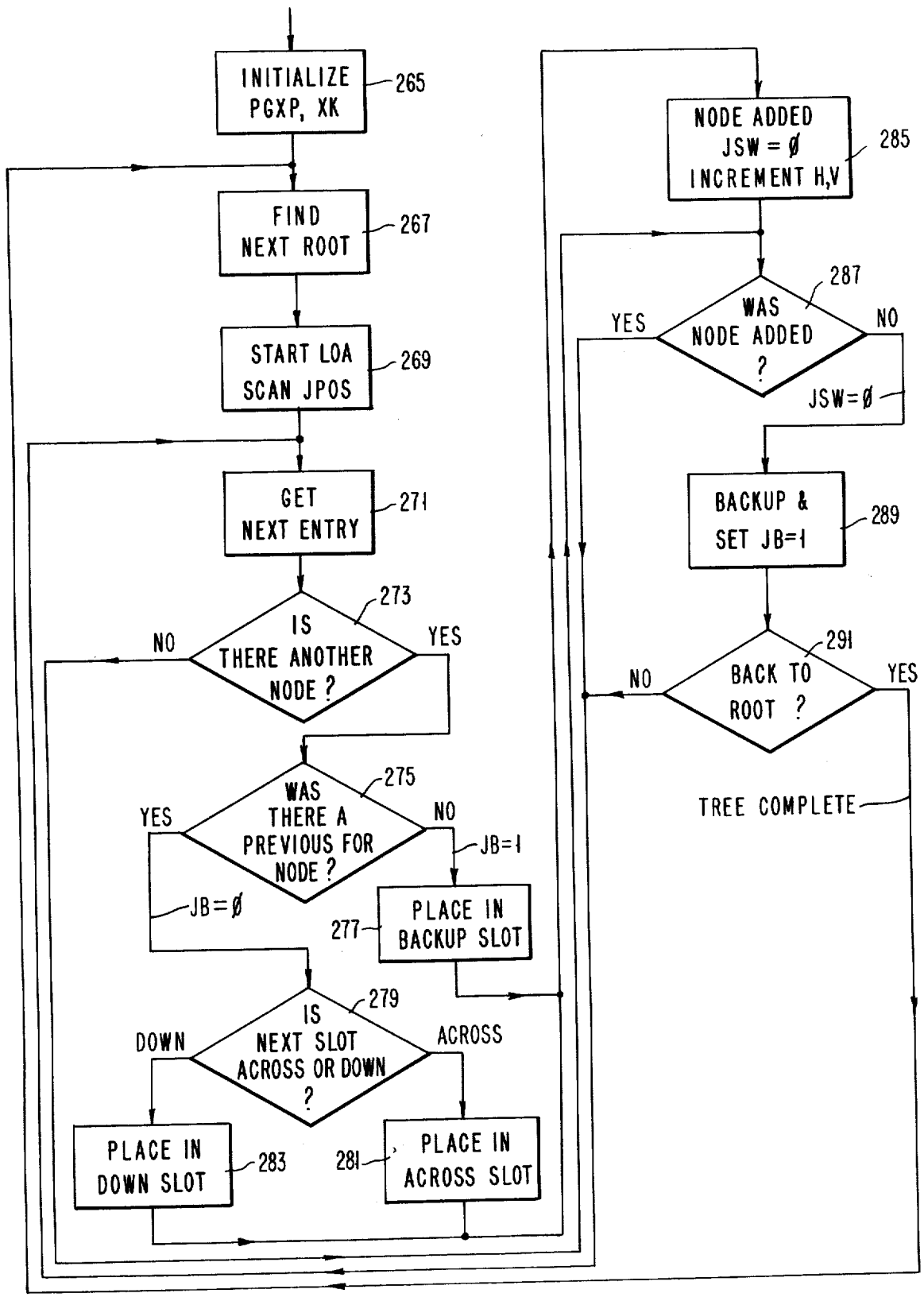
FIG. 7 depicts a flow chart representing a more detailed way in which the general step represented by Block 9 of the overall process of FIG. 1A may be carried out.
Figure 8A:
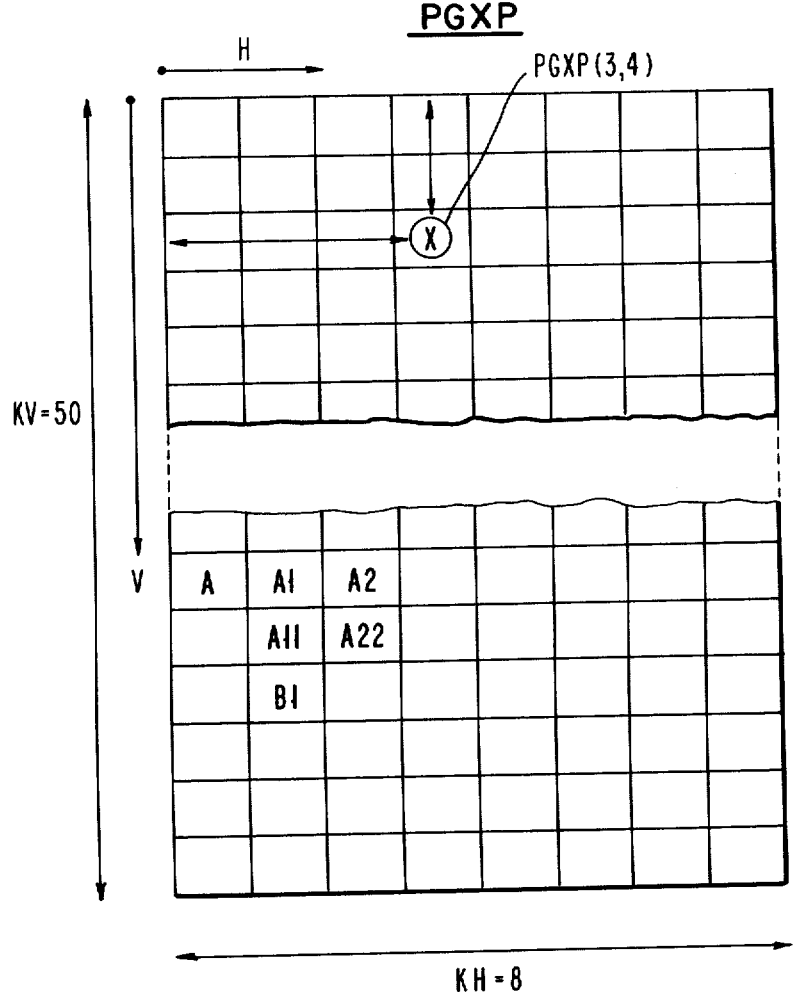
FIG. 8 depicts a table representation utilized in the description of the flow-charted routine shown in FIG. 7.
Figure 8B:

Module 6, as shown in FIG. 7, depicts a routine for generating a rudimentary parent/child graph or network to illustrate the basic approach to obtaining a graphic output of the data base designed in accordance with the process of the present invention. The first step in the routine is to allocate two tables to be used in the calculation. These may be designated PGXP and XH and are allocated by the "initialize" instruction represented by Block 265 in FIG. 7 and Lines of Code 234 and 235. FIGS. 8A and 8B depict these tables. As shown in FIG. 8A, PGXP has been allocated as having eight positions across (KH) to allow for an eight level parent/child graph being 50 deep (KV). It is clear that each of these numbers can be arbitrarily assigned based on problem size. The parent/child graph is processed for layout on Table PGXP, as shown in FIG. 8A. Root keys will appear in the first column, second level keys in the second column, and so forth. In FIG. 8B, the table XH is KH-8 deep for internal bookkeeping as the parent/child graph is generated.

The first operation of Module 6 in FIG. 7, as shown, is to scan the LOA with a primary DO loop using variable KT. This is achieved by Lines 242-301 of the appended code which corresponds to Blocks 267, 269 and 291. This scan is used to find each root key which is done according to the instructions of Lines 243-244 of the appended code. The operation is represented by Block 267-283 in FIG. 7. Each new root key is placed in the first available left-hand column of PGXP which has not been used. The first root key is placed in PGXP (1,1). Each root key is used to generate a separate subgraph by finding each successive child in a manner to be described hereinafter. Lines 245-253 of the appended code initialize the variables for each subgraph computation. JTN is the count of root keys.

Each subgraph or tree is generated into PGXP using a left to right trace until no more connections are found. Then the trace is backed up to extend the previous level. The variables V and H, as shown in FIG. 8A, continually keep track of the last position used in PGXP. The variable JSW, as shown in Block 285 in FIG. 7, is used to detect two conditions. When the entire tree has been generated, then JSW=555 and a next root key, if an, is looked for. The second condition occurs when JSW=9999 to thereby indicate when no new node can be added, such that the trace must be backed up by decrementing H by −1. When JSW=φ, then the program is attempting to find another node to add. The variable JB, when set to 1, as shown by Block 289 in FIG. 7, indicates that no new node was found and a backup should occur.

As an example, consider the root key "A" shown on the PGXP table in FIG. 8A. The root key "A" is placed in the leftmost column or H=1 and the current setting of V, PGXP(V,1). This is shown by Line 253 of the appended code. JSW is at 444, JB=φ, and the root key is placed in XK(1). Then the DET DO loop on Line 254 of the code is entered and the tree generation will continue until JSW is no longer 555. At The start of each attempt, JSW is set to zero, as shown by Line 255 of the appended code.

The next DO loop DE2 on Line 256 of the appended code will scan PGXP left to right eight times or until no further tree members are found. The variable JSW is set to 9999 on Line 257 of the code. Now LOA is scanned to find any key whose dominant parent key is "A,"

which is in XK(1). This is the DE3 DO loop having variable JPOS, as shown by Line 258 of the appended code. The first key found is A1 and A1 is placed in STR2 for future checking. Note that XK(2) was blank so that condition FROM(JPOS)>XK(H+1) of Line 259 of the appended code is satisfied as well as the test for a dominant key. The new node A1 will be placed forward, down or across depending on previous conditions.

If a backup had occurred, then JB=1, otherwise JP=φ. In this case, JB=φ. If the next rightmost entry in PGXP(H+1), (in this case H+1=2) is empty, then the "across" choice is made, as represented by Block 281. Since the entry is empty, then A1 is placed in PGXP(V,2), as shown in FIG. 8A. The code for this operation is shown at Lines 269–271 of the appended code. After this three-way choice, A1 is also placed in XK(2), as shown by Line 284 of the appended code. Then, H is incremented to 3 and, as shown on Line 285 of the appended code and Block 285 in FIG. 7, JSW=φ. The forward movement does not continue because of the operation performed by Line 286 of the code which operation acts to end the current DE3 loop. But since JSW=φ, DE2 continues with H=3, and DE3 is reentered for another operation.

Now the DE3 loop finds A2, as shown by Line 265 of the appended code, as key whose dominant parent is A1. The process repeats across with PGXP(V,3)=A2 and XK(3)=A2. The next DE3 loop attempt will find no key whose dominant parent is A2 due to the test provided by Line 259 of the code; hence DE3 ends with JSW=9999. Now the operation of Lines 293–298 is entered. On Line 293, since JSW=9999 and H>1 (H=3), then JSW is set to φ, JB=1 and H is backed up by one to H−1, or 2, as shown by Lines 294–296 of the appended code represented by Block 289 in FIG. 7.

Thereafter, the DET DO loop continues by reentering the DE2 DO loop, to begin another attempt at a forward scan. Since H=2, the A1 entry is involved. The test shown by Line 259 of the appended code is not met, since XK(3)=A2 and the only key whose dominant key is A1 is A2, hence FROM(JPOS)=XK(3). Since JSW=9999 and H>1, shown by Line 293 of the appended code, H is decremented again to 1, JB=1 and JSW=0.

Then, DE2 is reentered with H=1. The test shown by Line 259 of the appended code is passed with A11. This is represented by the "Place in Down Slot" instruction of Block 283 in FIG. 7. Now the 3-way choice mentioned earlier is shown by Lines 262–268 of the code. PGXP(V+1,2)=A11 via Line 263 of the code, and V is incremented to V+1. Note that the DO loop on Lines 265–267 of the appended code is entered, since H+2=3 and KH=8, and XK will now contain XK(1)=A, XK(2)=A1, the remainder being cleared to blank. The DO loop on Lines 269–271 of the appended code represented in Block 281 in FIG. 7 is not entered, since PGXP(JCL,H+1) is not blank. Then, on Line 284 of the code, XK(2)=A11, H is incremented to 2 and DE3 loop ended. At this point JSW=φ, as shown by Line 294 of the appended code. Now the forward movement is initiated at (V+1) and H=2. The test of Line 269 of the code will find A22, since XK(3) is blank. A22 is placed, as shown in FIG. 8A, and the cycle restarts. This time no key is found for A22 and JB=1 as shown by Line 295 of the code. Backup will proceed to A11, and then A.

Now DET is entered with H=1, but XK(1)=A, XK(2)=A11, with the remainder of XK being blank. The test of Line 259 of the appended code will find B1. The test of Line 262 of the code involving the 3-way decision is met, and B1 will be placed at V+2 and H=2 as shown in FIG. 8A. The test for B1 finds no new key, and backup occurs until A is reached. Now JB=1, XK(1)=A, XK(2)=B1. The test of Line 259 of the code cannot be passed and JSW=9999. Now the test on Line 298 of the code is met, and JSW=555. The DET loop is not reentered, and the next root key is selected with DE1, repeating the tree generation cycle.

While the invention has been particularly shown and described with reference to preferred embodiments thereof, it will be understood by those skilled in the art that various changes in form and details may be made therein without departing from the spirit and scope of the invention.

APPENDIX

PL/I OPTIMIZING COMPILER  /******* ASSOCIATIVE FILE DESIGN   XXTYPE (AFDX) *******/

SOURCE LISTING

```
STMT LEV NT

/********* ASSOCIATIVE FILE DESIGN    XXTYPE (AFDX) *********/    00010000
             /**         DEC 1974  PL/1 OPTIMIZER                       **/    00020000
             /** THIS PROGRAM ILLUSTRATES THE PRIMITIVES INVOLVED IN    **/    00030000
             /** ASSOCIATIVE FILE DESIGN. SEVERAL BASIC STEPS ARE INVOLVED **/ 00040000
             /** AND THESE ARE SEQUENTIALLY CODED BELOW.                **/    00050000
             /**********************************************************/     00060000
                                                                               00070000
   1    0    PROC: PROCEDURE OPTIONS(MAIN);                                    00080000
   2    1 0  PUT EDIT('**** ASSOCIATIVE FILE DESIGN PRIMITIVES (AFDX) ****')   00090000
                 (PAGE,SKIP(10),COLUMN(15),A);                                 00100000
   3    1 0  PUT EDIT('**** DEC 1974      ****') (SKIP,COLUMN(26),A);          00110000
   4    1 0  PUT EDIT('**** VERSION1      ****') (SKIP,COLUMN(26),A);          00120000
             /**********************************************************/     00130000
   5    1 0  DCL RPT   CHAR(72),                /*RAW PAIR TEMPLATE*/          00140000
                  CARD  CHAR(69) DEFINED RPT POSITION(1),  /* CARD INPUT */    00150000
                  ET    CHAR(1)  DEFINED RPT POSITION(1),  /* ENTRY TYPE */    00160000
                  FC    CHAR(1)  DEFINED RPT POSITION(2),  /* FROM LEVEL */    00170000
                  FDN   CHAR(20) DEFINED RPT POSITION(3),  /* FROM DN    */    00180000
                  TC    CHAR(1)  DEFINED RPT POSITION(23), /* TO LEVEL   */    00190000
                  TDN   CHAR(20) DEFINED RPT POSITION(24), /* TO DN      */    00200000
                  TYPE  CHAR(1)  DEFINED RPT POSITION(44), /* ASS. TYPE  */    00210000
                  AL    CHAR(20) DEFINED RPT POSITION(45), /* ASS. LABEL */    00220000
                  DF    CHAR(1)  DEFINED RPT POSITION(65), /* DECOMP FLAG*/    00230000
                  SF    CHAR(1)  DEFINED RPT POSITION(66), /* SUBSET FLAG*/    00240000
                  MF    CHAR(1)  DEFINED RPT POSITION(67); /* MISCELL.   */    00250000
                                                                               00260000
             AVIEW*                                                            00270000
             PICTURE '0000'    DEFINED RPT POSITION(6),  /*HEADER.AVIEW*/      00280000
             WT                                          /*HEADER.WEIGHT*/     00290000
             PICTURE '000000*  DEFINED RPT POSITION(12)  /****/                00300000
             /**** CT= '|D' IS A RAW PAIR                           */         00310000
             /**** CT='H' IS A HEADER FOR SUCCEEDING RP ****/                  00320000
   6    1 0  DCL 1 LOA(*) CONTROLLED,        /*LIST OF ORIGINAL ASSOC.*/       00330000
                  2 FROM CHAR(20),                                             00340000
                  2 TO   CHAR(20),                                             00350000
                  2 ALAB CHAR(20),                                             00360000
```

```
     2  TYPEL  CHAR(1)                                                   00370000
     2  CF     CHAR(1)                                                   00380000
     2  CT     CHAR(1)                                                   00390000
     2  EF     CHAR(1)           ,        /*LIST OF IMPLIED ASSOC.*/     00400000
DCL  1  IAL(*) CONTROLLED,                                               00410000
     2  F      CHAR(20),                                                 00420000
     2  T      CHAR(20),                                                 00430000
     2  A      CHAR(20),                                                 00440000
     2  TF     CHAR(1),                                                  00450000
     2  DUM1   CHAR(3)           ;        /*DUMMY FIELD*/                00460000
     DCL RPF      SEQUENTIAL ENVIRONMENT(CONSECUTIVE);                   00470000
     DCL SORTIN   SEQUENTIAL ENVIRONMENT(CONSECUTIVE);                   00480000
     DCL SORTOUT  SEQUENTIAL ENVIRONMENT(CONSECUTIVE);                   00490000
     OPEN FILE(SORTIN) OUTPUT /*PREPARE SORTIN FOR DATA*/                00500000
     JRD = 0;                    /* RAW PAIR COUNT */                   00510000
/************************************************************/         00520000
/* MODULE1:                                                   */        00530000
/*  1)READ AVIEWS PLUS OTHER DATA; STORE IN SORTIN            */        00540000
/*  2)SORT AND COMPRESS AND THEN STORE INTO LOA               */        00550000
/************************************************************/         00560000
/**** READ AVIEWS INTO SORTIN & PRINT INPUT           ****/             00570000
/************************************************************/         00580000
     PUT EDIT(' ',' ')         (PAGE,X(10),A);                           00590000
     PUT EDIT ('INPUT DATA ')  (SKIP,X(27),A);                           00600000
     PUT EDIT (' ')            (SKIP,X(10),A);                           00610000
     PUT EDIT('CARD#','DATA (FROM COL3 TO COL 71 INCLUSIVE)')            00620000
          (SKIP(3),X(5),A,X(7),A);                                       00630000
     PUT EDIT((5)' ',(60)'_')  (SKIP,X(5),A,X(7),A);                     00640000
     ALLOCATE LOA(1);                                                    00650000
DR: DO;                          /* READ EACH INPUT CARD UNTIL END OF FILE*/ 00660000
     KERROR = 0;                                                         00670000
     ON ENDFILE(SYSIN) GO TO EOF;                                        00680000
     GET EDIT(CARD)             (SKIP,X(2),A(69)) /*READ A CARD*/        00690000
     PUT EDIT(JRD+1,RDT)        (SKIP,X(5),F(4),X(0'),A)                 00700000
     IF FT=' '|FT='0'|FT=0. THEN DO;                                     00710000
     IF F(N=(20)' '|TDN=(20)' ' THEN KERROR=777;                         00720000
     IF TYPE='1'|CTYPE='C'|TYPE=' ' THEN KERROR=777;                     00730000
     IF KERROR=777 THEN PUT EDIT('PREVIOUS CARD IN ERROR',(9)'X')        00740000
          (SKIP(3),X(30),A,X(5),A);                                      00750000
     END;                                                                00760000
     IF KERROR=777 THEN GO TO DR;                                        00770000
     IF FT='M' THEN DO;                                                  00780000
     JRD = JRD+1;                                                        00790000
```

```
                     FROM = FRM
                     TO = TRN
                     ALAH = AL
                     TYPFL = TYPE
                     CF = ''
                     CT = ''
                     EF = ''
                     WRITE FILE(SORTIN) FROM(LOA)  /*STORE THIS REC.*/
                 END
                 GO TO OB    /* READ NEXT CARD */
          EOF:    CLOSE FILE(SORTIN)
                 FREE LOA
          DCL    RETCDE   FIXED BINARY(31,0)
                 SORTNO   PICTURE '999999'    ,
          DCL    STR1 CHAR(63) VARYING ,
                 STR2 CHAR(63) VARYING ,
                 STR3 CHAR(63) VARYING ,
                 STRP CHAR(105) VARYING  ;
                 SORTNO = JRP /*NUMBER OF RECORDS TO BE SORTED*/
          /*********** SORT BY FRM+TO+ACC.LAB+TYPE  *************************/
          /****************************************************************/
          /****************************************************************/
          CALL PLISRTA('  SORT FIELDS=(1,61,CH,A) ',
                       ' RECORD TYPE=F,LENGTH=(064) ',
                       032000,RETCDE,'');
          ALLOCATE LOA(JRP+1)   /*CREATE LOA IN CORE, JRP+1 */
                 LOA = ''       /*CLEAR ALL ENTRIES*/
                 CT = ''  ,
                 CF = ''  ,
                 EF = ''  ,
          CLOSE FILE(SORTIN)
          OPEN FILE(SORTOUT) INPUT
          JPOS = 0
          DO JR=1 TO JRP  /*COMPRESS AND STORE INTO LOA*/
             READ FILE(SORTOUT) INTO(LOA(JRP+1))
             IF JR=1 THEN DO
                LOA(1)=LOA(JRP+1)
                JPOS = 1
             END
             IF JR>1 THEN DO
                STR1 = ''      /*LAST OR OLD RECORDS*/
                STR2 = ''      /*NEXT RECORD FOR POSSIBLE DISCARD*/
          STR1 = FROM(JRP+1)||TO(JRP+1)||ALAB(JRP+1)
          STR1 = STR1||TYPEL(JRP+1)||CF(JRP+1)||CT(JRP+1)||EF(JRP+1)
          STR2 = FROM(JPOS)||TO(JPOS)||ALAB(JPOS)
```

```
                                                                                       01260000
    STR2 = STR2||TYPEL(JPOS)||CF(JPOS)||CT(JPOS)||FF(JPOS)                              01270000
        IF (STR1 ¬= STR2)             THEN DO                                           01280000
            LOA(JPOS+1) = LOA(JPOS+1)                                                   01290000
            JPOS = JPOS+1                                                               01300000
                                                                                        01310000
        END                                                                             01320000
    END                                                                                 01330000
    CLOSE FILE(SORTOUT)                                                                 01340000
    CALL PRINTLOA                                                                       01350000
/*****************************************************************/                    01360000
/*                                                             */                      01370000
/*  MODULE2:                                                   */                      01380000
/*    1)CALCULATE KEYS, MARK INTO CFCCT                        */                      01390000
/*    2)CALCULATE ATTRIBUTES, MARK INTO CFCCT                  */                      01400000
/*    3)CHECK THE RESULTS FOR ANY OMISSIONS                    */                      01410000
/*    NOTE THAT THE KEY VERSUS ATTRIBUTE COMPUTATION           */                      01420000
/*    CAN ALSO CHECK AN ASSIGNMENT MADE ON THE INPUT           */                      01430000
/*    BY THE DESIGNER ON HIS INPUT SPEC. THE COMPUTATION       */                      01440000
/*    REMAINS THE SAME BUT THERE WILL BE DIAGNOSTICS           */                      01450000
/*    FOR THIS KIND OF CHECK.                                  */                      01460000
/*****************************************************************/                    01470000
        JLOA = JPOS                                                                     01480000
        JPOS = 0                                                                        01490000
    DO JP=1 TO JLOA                                                                     01500000
        IF TYPEL(JP)='1' THEN DO    /*IS IT A KEY?*/                                    01510000
        DO JPOS=1 TO JLOA           /*IF SO, MARK ALL OCCURENCES*/                      01520000
            IF FROM(JPOS)=FROM(JP) THEN DO                                              01530000
                IF CF(JPOS)=' ' THEN CF(JPOS)='K'                                       01540000
                IF CF(JPOS)='K' THEN DO                                                 01550000
                    PUT EDIT('FROM ID') (SKIP,A)                                        01560000
                    PUT DATA(JP,JPOS,FROM(JPOS))                                        01570000
                END                                                                     01580000
                IF TO(JPOS) = FROM(JP) THEN DO                                          01590000
                    IF CT(JPOS)=' ' THEN CT(JPOS)='K'                                   01600000
                    IF CT(JPOS)='K' THEN DO                                             01610000
                        PUT EDIT('FROM ID') (SKIP,A)                                    01620000
                        PUT DATA(JP,JPOS,CT(JPOS))                                      01630000
        END                                                                             01640000
    END                                                                                 01650000
    DO JP=1 TO JLOA                                                                     01660000
        IF TYPEL(JP)='2'|TYPEL(JP)='3'|TYPEL(JP)=K'|CT(JP)='A' THEN DO /*MARK ATTRIBUTES*/ 01670000
            CT(JP) = 'A'                                                                01680000
        DO JPOS=1 TO JLOA                                                               01690000
```

```
              IF JPOS=JP THEN DO
                IF TO(JPOS)=TO(JP)&CT(JPOS)=' ' THEN CT(JPOS)='A'
                IF TO(JPOS)=TO(JP)&CT(JPOS)-='A' THEN DO
                  PUT EDIT('ERROR 12')  (SKIP,A)
                  PUT DATA(JP,JPOS)
                END
              IF TYPEL(JPOS)-='1'&(FROM(JPOS)=TO(JP)&
                                    CF(JPOS)=' ' THEN CF(JPOS)='A'
              IF TYPEL(JPOS)-='1'&CTF(JPOS)=TO(JP)&
                                    CT(JPOS)=' ' THEN CT(JPOS)='A'
            END
          END
        END
      END
      DO JP=1 TO JLOA    /*ANY RESIDUE ?*/
        IF CT(JP)-='A'&CT(JP)-='K' THEN DO
          PUT EDIT('ERROR 16')  (SKIP,A)
          PUT DATA(JP,FROM(JP),TO(JP))
        END
        IF CF(JP)-='A'&CF(JP)-='K' THEN DO
          PUT EDIT('ERROR 17')  (SKIP,A)
          PUT DATA(JP,FROM(JP),TO(JP))
        END
      END
  CALL PRINTLOA
  /*****************************************************/
  /* MODULE3:                                           */
  /*  1)CALCULATE ALL SPANS OF 3 FROM LOA AND PLACE INTO IAL */
  /*  2)PRINT IAL                                       */
  /*  3)CALCULATE NEXT SPAN LEVEL FROM IAL AND LOA, INTO IAL */
  /*  4)SORT ALL IAL ENTRIES AND REPLACE INTO IAL       */
  /*  5)PRINT IAL AGAIN                                 */
  /*  6)IF THERE ANY NEW ENTRIES FOUND THEN GO BACK TO STEP3. */
  /*     IF THERE WERE NO NEW ENTRIES FOUND THEN TERMINATE.   */
  /*****************************************************/
  /*STEP1: INITIALIZE IAL WITH ALL SPANS OF LENGTH 3*/
        KT = 3*JLOA
        ALLOCATE IAL(KT)
          IAL = ' '
          JS = 0
          KP = 0
          KX = 0
        DO JP=1 TO JLOA
          IF TYPEL(JP)='1' THEN DO
          DO JT=1 TO JLOA
            IF FROM(JT)=TO(JP)&TYPEL(JT)='1' THEN DO
```

```
137            IF FROM(JF) = TO(JT) THEN DO /*LOOP CHECK*/
138               PUT EDIT('*ERROR20-LOOP') (SKIP(2),A)
139               PUT DATA(FROM(JF),TO(JF),TO(JT))
140            END
141            IF FROM(JF) ¬= TO(JT) THEN DO
142               F(KP+1) = FROM(JF)    /*NEXT POSITION (KP+1)*/
143               T(KP+1) = TO(JT)
144               STR3 = ''
145               IF ALAR(JF) ¬= (20)' ' THEN DO
146                  ILF = (INDEX(ALAR(JF),' ')-1)
147                  STR3 = SUBSTR(ALAB(JF),1,ILE)
148               END
149               IF ALAR(JT) ¬= (20)' ' THEN DO
150                  ILE = (INDEX(ALAR(JT),' ')-1)
151                  STR3 = STR3||'.'||SUBSTR(ALAR(JT),1,ILE)
152               END
153               A(KP+1) = STR3
154               KP = KP+1
155               IF KP >= (3*JLOA) THEN DO    (PAGE,A)
156                  PUT EDIT('*ERROR-22')
157                  RETURN                    /* TERMINATE */
158               END
159            END
160         END
161      END
162   CALL  /******* RECURSIVELY COMPUTE NEXT NODE ************/
163   PRINTIAL ;
164         DO IT=1 TO 10    /*REPEAT UP TO 10 TIMES AS NEEDED*/
165            CALL NEXTIAL  /*ADD NEXT NODES TO IAL*/
166            CALL SORTIAL  /*SORT AND COMPRESS IAL*/
167   CALL PRINTIAL
168         IF JS = 0 THEN IT=30   /*END RECURSIONS*/
169      END
170   /*********************************************/
171   /* MODULE4:                                   */
      /* 1)USING IA1 & LOA, CALCULATE THE ESSENTIALS AND MARK */
      /*   AS '*' INTO LOA.                        */
      /*   NOTE THAT A TABLE OF ASSIGNED VALUES COULD BE */
      /*   ADDED TO THIS COMPUTATION. THE DESIGNER WOULD */
      /*   SPECIFY THAT A PATICULAR ASSOCIATION IS ESSENTIAL */
      /*   OR THAT A PATICULAR ASSOCIATION IS EQUIVALENT TO */
      /*   TO OTHER ASSOCIATIONS THAT ARE ESSENTIAL. THIS */
      /*   COULD OVERRIDE THE CURRENT ALGORITHM.    */
      /*********************************************/
```

```
172  1       DO   JL=1 TO JLOA   /*SCAN LOA*/                                      :|02640000
173  1          JTEST = 0                                                           :|02650000
174  1          IF TYPFL(JL) = '1' THEN DO                                          :|02660000
175  1             DO IP=1 TO KP                                                    :|02670000
176  2                STR1 = ''                                                     :|02680000
177  3                STR2 = ''                                                     :|02690000
178  3                STR1 = FROM(JL)||TO(JL)||ALAM(JL)                             :|02700000
179  3                STR2 = F(IP)||T(IP)||A(IP)                                    :|02710000
180  3                IF STR1 = STR2 THEN JTEST=20                                  :|02720000
181  3             END                                                              :|02730000
182  2          IF JTEST=20 THEN EF(JL)='N'                                         :|02740000
183  2          IF JTEST=0  THEN EF(JL)='E'                                         :|02750000
184  2          END                                                                 :|02760000
185  1          IF TYPCL(JL)= '1' THEN FF(JL)='N'                                   :|02770000
186  1       END                                                                    :|02780000
187  1       CALL PRINTLOA                                                          :|02790000
                                                                                    :|02800000
/*************************************************************/                    :|02810000
/* MODULES:                                                  */                    :|02820000
/*   1)CALCULATE ROOT KEYS, AND MARK LOA.CF & LOA.CT WITH 'R'*/                    :|02830000
/*   2)SELECT ONE DOMINANT PARENT AND MARK LOA.EF WITH 'D'   */                    :|02840000
/*   NOTE THAT THE DESIGNER COULD SPECIFY A ROOT KEY.        */                    :|02850000
/*   AND THIS COULD BE USED TO GIVE SUGGESTED SECONDARY      */                    :|02860000
/*   INDEXES PLUS DIAGNOSTICS                                */                    :|02870000
/*************************************************************/                    :|02880000
/* CALCULATE ROOT KEYS */                                                           :|02890000
188  1       DO   JP=1 TO JLOA  /*SELECT EACH KEY*/                                 :|02900000
189  1          IF CF(JP)='K' THEN DO                                               :|02910000
190  1             JCNT=0                                                           :|02920000
191  1             DO JPOS=1 TO JLOA                                                :|02930000
192  2                IF FROM(JP)=FROM(JPOS)&FF(JPOS)='E'                           :|02940000
                       &(CT(JPOS)=K'|CT(JPOS)='R') THEN DO                         :|02950000
193  3                   JCNT = JCNT+1                                              :|02960000
194  3                END                                                           :|02970000
195  2             END                                                              :|02980000
196  1             IF JCNT=0 THEN DO  /*MARK ALL FROM(JP) AS 'R'*/                  :|02990000
197  2                DO JPOS=1 TO JLOA                                             :|03000000
198  3                   IF FROM(JPOS)=FROM(JP) THEN CF(JPOS)='R'                   :|03010000
199  3                   IF TO(JPOS)  =FROM(JP) THEN CT(JPOS)='R'                   :|03020000
200  3                END                                                           :|03030000
201  2             END                                                              :|03040000
202  1          END                                                                 :|03050000
203  1       END                                                                    :|03060000
/*****************************************************************/                :|03070000
/***** THE SELECTION OF A DOMINANT PARENT IS DONE           *****/                  :|03080000
/***** ARBITRARILY IN THIS PROGRAM. A MORE COMPLEX          *****/                  :|03090000
/***** ALGORITHMIC APPROACH WOULD BE TO CHOOSE A PARENT     *****/                  :|03100000
```

```
/***** ON THE BASIS OF ADDITIONAL CRITERIA SUCH AS   *****/   03100000
/***** SUBSET OR DECOMP BETWEEN PAREN/CHILD. THE USAGE *****/ 03110000
/***** OR WEIGHT BETEEN PARENT/CHILD. OR THE ARBITRARY *****/ 03120000
/***** SELECTION BY THE ANALYST BASED ON OTHER CRITERIA *****/ 03130000
/*****                                               *****/   03140000
/***** SELECT ONE DOMINANT PARENT                             03150000
PUT EDIT('REPORT ON ANY KEY WITH MORE THAN ONE PARENT') (PAGE,A); 03160000
PUT EDIT(' ') (SKIP(2),A);                                   03170000
    STR1 = ' ';                                              03180000
    DO JP=1 TO JLOA                                          03190000
      IF STR1=FROM(JP)¦CF(JP)='K' THEN DO /*EACH NONROOT*/   03200000
        STR1=FROM(JP);                                       03210000
        JCNT=0                                               03220000
        DO JPOS=1 TO JLOA    /*FIND ALL PARENTS FOR 'KEYS*/  03230000
          IF FROM(JPOS)=FROM(JP)&F(JPOS)='F'&                03240000
             (CT(JPOS)='K'¦CT(JPOS)='R') THEN DO             03250000
            JCNT = JCNT+1                                    03260000
            IF JCNT=1 THEN EF(JPOS)='D' /*NOMORE FIRST*/     03270000
            IF JCNT>1 THEN DO             ')(SKIP,A)         03280000
              PUT EDIT('ADDITIONAL PARENTS      ')(SKIP,A)   03290000
              ILF = (INDEX(FROM(JPOS),' ')-1)                03300000
              STR1 = SUBSTR(FROM(JPOS),1,ILF)                03310000
              ILF = (INDEX(TO(JPOS),' ')-1)                  03320000
              STR2 = SUBSTR(TO(JPOS),1,ILF)                  03330000
              ILF = (INDEX(ALIA(JPOS),' ')-1)                03340000
              STR3 = SUBSTR(ALAR(JPOS),1,ILF)                03350000
              PUT EDIT(' ',STR1,' ',STR2,' ¦ ',STR3)         03360000
                       (A,A,A,A,A)                           03370000
            END                                              03380000
          END                                                03390000
        END                                                  03400000
      END                                                    03410000
    END                                                      03420000
END DPIUTLOA                                                 03430000
CALL DPIUTLOA                                                03440000
/*****************************************************/     03450000
/** MODULES:                                         **/     03460000
/**  1)EXPLODE GRAPH INTO DG.0                       **/     03470000
/**    -EACH NEW TREE STARTS AT DFI                  **/     03480000
/**    -EACH TREE IS TRACED ACROSS, THEN PACKED UP, THEN DOWN, **/ 03490000
/**     AND THEN FORWARD TO THE END                  **/     03500000
/**  2)PRINT GRAPH FROM DG.0                         **/     03510000
/**   NOTE THAT THE CONNECTIONS BETWEEN TREES ARE PRINTED OUT **/ 03520000
/**   FOR MANUAL TIEINS BY THE DESIGNER. A MORE COMPLEX       **/ 03530000
/**   ALGORITHM COULD BE ADDED WHICH MINIMIZES THE CROSSINGS **/ 03540000
/**   BETWEEN TREES. THIS ALGORITHM WOULD ARRANGE THE ADJACENCY **/ 03550000
/**   BETWEEN TREES SO THAT THE TIEINS OR CONNECTIONS TRAVERSE **/ 03560000
/**   MINIMUM DISTANCE.                              **/     03570000
```

```
       KH = 07   /*KH=ACROSS*/ ; KV=050  /*KV=DOWN*/
   DCL XK(*)     CHAR(20) CONTROLLED ,
       (H,V)     BINARY FIXED
   DCL PGXP(*,*) CHAR(20) CONTROLLED
   ALLOCATE XK(KH)
   ALLOCATE PGXP(KV,KH)  CHAR(20)
       PGXP = ' '  ;  XK = ' '
          V = 0
          JTN = 0   /* JTN=NUMBER OF TERMINAL KEYS */
          STR1 = ''
          STR2 = ''
DE1:   DO KT=1 TO JLOA /* START OF NEW TREE */
          IF CF(KT)=0*(FROM(KT)-=STR1 THEN DO
             STR1 = FROM(KT)
             JTN = JTN+1
             JSW = 444
             JF = 0
          H = 1 ;  XK = ''
          PGXP(V+1,*)  =  (20)'-'     /*TREE SEPARATOR*/
          V = V+3
          XK(1) = FROM(KT)
          PGXP(V,1) = FROM(KT)
DET:   DO WHILE(JSW-=555)  /* ITERATE UNTIL JSW=555 */
          JSW=0
DE2:   DO JF=H TO KH WHILE (JSW=0)  /* GO FORWARD */
          JSW = 0000
DE3:   DO JPOS=1 TO JLOA /*FIND ONE NEW KEY OR BACKUP*/
          IF TO(JPOS)=XK(H)&FF(JPOS)=0.0  &  XK(H+1)  THEN DO
                           FROM(JPOS)>XK(H+1)
             STR2 = FROM(JPOS)
             JSW = 0
          IF JR=0&PGXP(V,H+1)-='' THEN  DO    /*GO DOWN*/
             PGXP(V+1,H+1) = STR2
             V = V+1
             DO JCL=H+2 TO KH   /* CLEAR FOR NEW TREE*/
                XK(JCL)=''
             END
          IF JB=0&PGXP(V,H+1)='' THEN DO    /*GO ACROSS*/
             PGXP(V,H+1) = STR2
          END
          IF JR=1 THEN DO    /*BACKUP ONE*/
             PGXP(V+1,H+1) = STR2
             V = V+1
             JB = 0
             DO JCL=H+2 TO KH     /* CLEAR FOR NEW TREE*/
```

```
277  1  1          END       XK(JCL)=''                                              :|04040000
278  6  1          DO JCL=(V-1) TO 1 BY(-1) WHILE (PGXP(JCL,M+1) ='')                 :|04050000
279  7  1            PGXP(JCL,M+1) = (20)'0'                                          :|04060000
280  8  1          END                                                                :|04070000
281  8  1                                                                             :|04080000
282  7  1          IF V=KV-2 THEN PUT EDIT('INCREASE # FOR KV')                       :|04100000
283  6  1                                  (PAGE,A)                                   :|04110000
284  6  1          XK(M+1) = STR2                                                     :|04120000
285  5  1          M = M+1                                                            :|04130000
286  4  1          JPOS = JLDA+1 /* FORCE DEF3 ENDS/                                  :|04140000
287  4  1        END                                                                  :|04150000
288  4  1      END DEF3                                                               :|04160000
289  4  1        IF JSW=0&JF>KM THEN DO                                               :|04170000
290  5  1          PUT EDIT('ERROR37, PAGE OVERRUN') (PAGE,A)                         :|04180000
291  4  1          END                                                                :|04190000
292  4  1        IF JSW=0&0&CM>? THEN DO                                              :|04200000
293  5  1          JSW = 0                                                            :|04210000
294  5  1          JR = 1                                                             :|04220000
295  5  1          M = M-1                                                            :|04230000
296  4  1          END                                                                :|04240000
297  4  1        IF JSW=0&0&CM=1 THEN JSW=5&5                                         :|04250000
298  3  1      END DEF1 END                                                           :|04260000
299  2  1    END                                                                      :|04270000
300  2  1    /*********                                        ***********/           :|04280000
301  1  1               PUT EDIT((60)'*')  (PAGE,X(10),A)                             :|04290000
302  0  1               PRINT      GRAPH                                              :|04300000
303  0  1    PUT EDIT('PARENT/CHILD GRAPH') (SKIP,X(20),A)                            :|04310000
304  0  1               PUT EDIT((60)'*') (SKIP,X(10),A)                              :|04320000
305  0  1    DO KD=1 TO V+1                                                           :|04330000
306  1  1      STRP = ''    ;    STR1 = ''                                            :|04340000
307  1  1      SORTNO = KD                                                            :|04350000
308  1  1      STR1 = SORTN0||(05)''                                                  :|04360000
309  1  1      DO KA=1 TO KM                                                          :|04370000
310  2  1        IF PGXP(KD,KA) -= (20)'0' THEN DO                                    :|04380000
311  3  1          STRP = STRP||(SUBSTR(PGXP(KD,KA),1,13))||'---'                     :|04390000
312  3  1          END                                                                :|04400000
313  2  1        IF PGXP(KD,KA) = (20)'0' THEN DO                                     :|04410000
314  3  1          STRP = STRP||'.'||(14)' '                                          :|04420000
315  3  1          END                                                                :|04430000
316  2  1      END                                                                    :|04440000
317  2  1      IF STRP -= (7)' '          THEN DO                                    :|04450000
318  3  1          PUT EDIT(STR1,STRP)   (SKIP,A,A)             /*NODES*/            :|04460000
319  2  1      END                                                                    :|04470000
320  2  1      IF STRP = (7)' '          THEN DO              /*NO NODES*/           :|04480000
321  3  1                                                                             :|04490000
```

```
                    PUT EDIT(' ')        (SKIP,A);
        END;
/*************  ENDEDED  PROCEDURES  ****************/
/*************                        ****************/
/*************                        ****************/
PRINTIAL: PROCEDURE /*PRINTS OUT THE IAL TABLE*/
          PUT EDIT('PRINTOUT OF IAL')   (PAGE,A);
          PUT EDIT(' ')                  (SKIP(2),A);
          STRP = '';
          DO K=1 TO KP
             SORTNO = K;
             STRP = SORTNO||'<<<<<<<<';
             STRP = STRP||''||F(K)||'==='||T(K)||'====';
             STRP = STRP||IA(K)||'==='||TF(K)||'====';
             PUT EDIT(STRP)              (SKIP,A);
          END;
END PRINTIAL;
SORTIAL:  PROCEDURE /*SORTS AND COMPRESSES THE IAL TABLE*/
          OPEN FILE(SORTIN) OUTPUT;
          DO JF=1 TO KP
             WRITE FILE(SORTIN) FROM(IAL(JF));
          END;
          CLOSE FILE(SORTIN);
          CALL PLISRTA(' SORT FIELDS=(1,61,CH,A) ',
                       ' RECORD TYPE=F,LENGTH=(064) ',
                       032000,RFTCDF,'');
          CLOSE FILE(SORTOUT) + FILE(SORTIN);
          OPEN FILE(SORTOUT);
          FREE IAL;
          KT = (20*KP);
          ALLOCATE IAL(KT);
          IAL = '';
          KX = 0;
          DO JF=1 TO KU
             READ FILE(SORTOUT) INTO(IAL(KT));
             STR1 = '';
             STR2 = '';
             IF JF > 1 THEN DO
                STR1 = F(KT)||T(KT);
                STR2 = F(KX)||T(KX)||A(KX);
             END;
             IF STR1 ¬= STR2 THEN DO
                IAL(KX+1) = IAL(KT);
                KX = KX+1;
                IF KX>KT THEN DO
```

```
                        PUT EDIT('ERROR-30') (PAGE,A)         04060000
                        PUT DATA(KX,KT,KP)                    04070000
                        RETURN                                04080000
                     END                                      04090000
                  END                                         04100000
                  IF STR1=STR2,TF(KT)='T' THEN TF(KX)='T'     04110000
               END                                            04120000
               KP = KX       /* NEW IAL LENGTH */             04130000
               CLOSE FILE(SORTNIT)                            04140000
            END SORTIAL                                       04150000
            NEXTIAL: PROCEDURE /*EXTENDS THE PATHS IN IAL BY ONE NODE*/ 04160000
                        KX = KP                               $ 05170000
                        JS = 0                                $ 05180000
                        DO JF=1 TO KP    /*SCAN ALL IAL*/     $ 05190000
                           IF TF(JF) ¬= 'T' THEN DO /*SHOULD PATH BE EXTENDED?*/ $ 05200000
                              DO JT=1 TO JLDA  /*SCAN ALL LDA*/ $ 05210000
                                 IF TYPCL(JT)=1,CT(JF)=FROM(JT) THEN DO $ 05220000
                                    IF F(JF)=TO(JT) THEN DO   $ 05230000
                                       PUT EDIT('ERROR-24-LOOPX') (SKIP(2),A) $ 05240000
                                       PUT DATA(F(JF),T(JF),TO(JT)) $ 05250000
                                    END                       $ 05260000
                                    IF F(JF)¬=TO(JT) THEN DO  $ 05270000
                                       JS = JS /* NEW IAL */  $ 05280000
                                       TF(KP+1) = ' '         $ 05290000
                                       F(KP+1) = F(JF)  /*OLD IAL*/ $ 05300000
                                       T(KP+1) = TO(JT)  /*NEW NODE*/ $ 05310000
                                       STR3 = ' '             $ 05320000
                                       IF A(JF)¬= (20)' ' THEN DO $ 05330000
                                          ILE = (INDEX(A(JF),' ')-1) $ 05340000
                                          STR3 = SUBSTR(A(JF),1,ILE) /*OLD LAREL*/ $ 05350000
                                       END                    $ 05360000
                                       IF ALAB(JT)¬= (20)' ' THEN DO $ 05370000
                                          ILE = (INDEX(ALAB(JT),' ')-1) $ 05380000
                                          STR3 = STR3||' '||SUBSTR(ALAB(JT),1,ILE) $ 05390000
                                       END                    $ 05400000
                                       A(KP+1) = STR3         $
                                       KP = KP+1              $
                                       IF KP>KX THEN DO       $
                                          PUT EDIT('ERROR-27') (PAGE,A) $
                                          PUT DATA(KP,KT,KX,JF,JT) $
                                          RETURN /*TERMINATE*/ $
                                       END                    $
                                    END                       $
                                 END                          $
```

```
410  2  2              END            /*THIS PAIR HAS BEEN EXTENDED*/         :| 05410000
411  -  2                             TF(JF) = 'T';                           :| 05420000
412  -  2              END                                                    :| 05430000
413  0  1           END NEXTIAL                                               :| 05440000
414  0  1           PRINTLOA: PROCEDURE /*PRINT OUT THE LOA TABLE*/           :| 05450000
415  0  2              PUT EDIT('PRINTOUT OF LOA') (PAGE,A)                   :| 05460000
416  0  2              PUT EDIT(' ')              (SKIP(2),A)                 :| 05470000
417  0  2              STRP = ' ';                                            :| 05480000
418  1  2              DO K=1 TO JRP                                          :| 05490000
419  1  2                 SORTNO = K                                          :| 05500000
420  1  2                 STRP = SORTNO||'->>>>>>>>'                          :| 05510000
421  1  2                 STRP = STRP||FROM(K)                                :| 05520000
422  1  2                 STRP = STRP||'**'||TO(K)||'**'||ALAB(K)||'**'       :| 05530000
423  1  2                 STRP = STRP||TYPEL(K)||'**'||CF(K)||'**'||CT(K)||'**' :| 05540000
424  1  2                 STRP = STRP||FF(K)                                  :| 05550000
425  1  2                 PUT EDIT(STRP) (SKIP,A)                             :| 05560000
426  1  2              END                                                    :| 05570000
427  0  1           END PRINTLOA                                              :| 05580000
                    /************************************************/        | 05590000
                    /*            END OF EXTENDED PROCEDURES        */        | 05600000
                    /************************************************/        | 05610000
428  1  0           ENDPROC:  END PROC ;                                      | 05620000
```

I claim:

1. A method for generating an integrated data base design structure for multiple applications on an interactive terminal computing system, comprising the steps of:

storing local views of data elements of each application of said multiple applications with each of said local views including first indication of forward association and second indication of backward associations between each of said data elements having associations therebetween, said first and second indications specifying whether each of said associations involve a single occurrence of the association, multiple occurrences of the association or a conditional occurrence of the association, and whether each of said data elements is unique;

sorting said indications into a first table of entries to form a list of associations;

removing all associations from said list of associations which have a similar key;

separating unique data elements from non-unique data elements in said list of associations;

calculating implied associations by scanning said list of associations to find any two association entries each of which has a single occurrence of the association and for which there is a common data element therebetween;

storing said implied association into a second table of entries to form an implied association list;

determining essential associations by scanning said list of associations for all single occurrence type associations and comparing each entry having a single occurrence type of association with each of the entries scanned in said implied associations list to determine if any entry in the implied association list corresponds to an entry in the list of associations and marking any entry in the list of associations for which there is a corresponding entry in the implied association list as nonessential and any entry in the list of associations for which there is no corresponding entry in the applied association list as essential; and storing a graphic representation of said design structure by combining said first table of entries and said second table of entries to minimize data redundancy in the data base design structure.

2. A method according to claim 1, wherein said step of calculating further comprises the steps of scanning entries of said second table; and comparing each of said entries of said second table of entries with each entry in said first table of entries to find any one-type association in the first table of entries which has a common data element with any one-type association in said second table of entries; and adding each said further implied association into said second table of entries.

3. In a system for producing an associative file design through the use of a programmed digital computer, wherein said digital computer is programmed to generate an integrated data base design structure for a multi-application computing system from user-specified local views of data required for the various individual user applications of said computing system, wherein said local views are characterized as defined rules for classifying data per a given user, the combination comprising:

means for storing the local views of said individual user applications into said digital computer, with said local views further being characterized as having predefined associations between different data elements, an association being defined as an occurrence of one data element relative to another data element;

means for analyzing the associations in each of said local views to determine which of said associations are the same, including removing associations that are the same such that each association appears only once;

means for processing the remaining associations after all the same associations have been removed, to determine which of the data elements of the remaining associations are unique, wherein a data element is characterized as being unique if no other data element has a similar key;

means for deriving from first and second associations, each of said first and second associations having a common data element, an implied association having the uncommon data elements of said first and second associations;

means for determining which of said associations are essential or non-essential, wherein an implied association is characterized as non-essential, and a non-implied association is characterized as essential; and means for storing said database design structure as a function of said associations, wherein said database design structure is determined by said essential associations.

4. The method as set forth in claim 1 wherein said step entering said local views of said user applications into said digital computer includes entering said local views into a table of entries to form a list of said predefined associations.

5. The method as set forth in claim 4 wherein said step of deriving an implied association includes entering the implied associations into a table of entries to form an implied association list.

6. The method as set forth in claim 5 wherein said step of deriving an implied association list includes the further steps of;

scanning said implied association to find any two association entries each of which involves a '1' type association and for which there is a common data element therebetween, such as (A,B):L1='1' and (B,C):L2='1', where A, B and C are the data elements L1 and L2 are the association labels; and entering the implied association (A,C):L1,L2='1' derived therefrom into the implied association list table.

7. The method as set forth in claim 6 wherein said step of deriving an implied association includes the further steps of;

scanning the entries of said implied association list table determined from scanning the list of associations table, one entry at a time, and comparing each of said entries with each of the entries as scanned in the list of associations table such that any entry (W,Z):L3='1' in the implied association list table for which there is an entry (Z,Q):L4='1' in the list of associations table has a further implied association (W,Q):L3,L4='1'; and entering said further implied association into the implied association list table.

8. The method as set forth in claim 7 wherein the step of determining which of said associations are essential or nonessential includes the steps of;

scanning the list of associations table, one entry at a time, for all type '1' associations and comparing each of said entries having '1' associations with each of the entries as scanned in the implied association list table to determine if there is any entry in the implied association list table corresponding to an entry in the list of associations table; and making any entry in the list of associations table for which there is a corresponding entry in the implied association list table as nonessential and any entry in the list of associations table for which there is no corresponding entry in the implied association list table as essential.

9. A method of producing an associative file design through the use of a programmed digital computer, wherein said digital computer is programmed to generate an integrated data base design structure for a multi-application computing system from user-specified local views of data, comprised of data elements, required for the various individual user applications of said computing system, wherein said local views are characterized as defined rules or classifying said data elements per a given user, said method comprising the steps of:

storing said local views of said individual user applications into said computer, with said local views further being characterized as having predefined associations between different data elements, said associations being defined as occurrences of one data element relative to another data element;

analyzing said associations in each of said local views to determine which of said associations are the same, including removing associations that are the same such that each association appears only once;

comparing the remaining associations after all said same associations have been removed, to determine which of the data elements of said remaining associations are unique, wherein a data element is characterized as being unique if no other data element has a similar key;

deriving from at least first and second associations, each of said first and second associations have a common data element, an implied association having the uncommon data element of said first and said second associations;

identifying said separating essential and nonessential associations wherein an implied association is characterized as nonessential, and a nonimplied association is characterized as essential; and storing said database design structure as a function of said associations, wherein said database design structure is determined by said essential associations.

10. The method of claim 9 wherein said associations are further defined as three basic types of associations namely, (a) a '1' association characterized as:

(A,B)='1' wherein;

each occurrence of data element A has a single associated occurrence of data element B;

(b) a 'M' association characterized as:

(A,B)='M' wherein;

each occurrence of data element A may have multiple occurrences of data element B;

(c) a 'C' association characterized as:

(A,B)='C' wherein;

not every occurrence of data element A has a single occurrence of data element B, but for those occurrences of data element A that do, each of these occurrences of data element A has only one occurrence of data element B.

11. The combination claimed in claim 3, wherein said associations are further defined as three basic types of associations namely, (a) a '1' association characterized as:

(A,B)='1' wherein;

each occurrence of data element A has a single associated occurrence of data element B;

(b) a 'M' association characterized as:

(A,B)='M' wherein;

each occurrence of data element A may have multiple occurrences of data element B;

(c) a 'C' association characterized as:

(A,B)='C' wherein;

not every occurrence of data element A has a single occurrence of data element B, but for those occurrences of data element A that do, each of these occurrences of data element A has only one occurrence of data element B.

12. The combination claimed in claim 11 wherein the means for storing said local views of said user applications to said digital computer includes means for storing said indications to a first table of entries to form a list of said predefined associations.

13. The combination claimed in claim 12 wherein said means for deriving an implied association includes means for storing said implied associations to a second table of entries to form an implied association list.

14. The combination claimed in claim 13 wherein said means for deriving an implied association list includes:

means for scanning said implied association to fine any two association entries each of which involves a '1' type association and for which there is a common data element therebetween, such that (A,B):L1='1' and (B,C):L2='1' where A,B and C are the data elements and L1 and L2 are the association labels; and means for storing the implied association (A,C):L1,L2='1' derived therefrom into the implied association list table.

15. The combination claimed in claim 14 wherein said means for deriving an implied association includes:

means for scanning the entries of said implied association list table determined from scanning the list of associations table, one entry at a time, and comparing each of said entries with each of the entries as scanned in the list of associations table such that any entry (W,Z):L3='1' in the implied association list table for which there is an entry (Z,Q):L4='1' in the list of associations table has a further implied association (W,Q):L3,L4='1'; and means for storing said further implied association to the implied association list table.

16. The combination claimed in claim 15 wherein said means for determining which of said associations are essential or nonessential includes:

means for scanning the list of associations table, one entry at a time, for all type '1' associations and comparing each of said entries having '1' associations with each of the entries as scanned in the implied association list table to determine if there is any entry in the implied association list table corresponding to an entry in the list of associations table; and means for marking any entry in the list of associations table for which there is a corresponding entry in the implied association list table as nonessential and any entry in the list of associations table for which there is no corresponding entry in the implied association list table as essential.

17. A method of producing an associative file design through the use of a programmed digital computer, wherein said digital computer is programmed to generate an integrated data base design structure for multiple applications on an interactive terminal computing system from user-specified local views of data, comprised of data elements, required for the various individual user application programs of said computing system, wherein said local views are characterized as defined rules for classifying said data elements per a given user, said method comprising the steps of:

storing the local views of each of said user application programs into said digital computer, with said local views further being characterized as having predefined associations between different data elements, said associations being defined as occurrences of one data element relative to another data element, with there being three types of associations, namely, (a) a '1' or single association characterized as:

(A,B)='1' wherein;

each occurrence of data element A has a single associated occurrence of data element B;

(b) a 'M' or multiple association characterized as:

(A,B)='M' wherein;

each occurrence of data element A may have multiple occurrences of data element B;

(c) a 'C' or conditional association characterized as:

(A,B)='C' wherein;

not every occurrence of data element A has a single occurrence of data element B, but for those occurrences of data element A that do, each of these occurrences of data element A has only one occurrence of data sorting said local views into a first table of entries to form a list of said associations;

analyzing said associations in said list of associations to determine which of said associations are the same, including removing associations that are the same such that each association appears only once;

comparing the remaining associations after all the same associations have been removed, to determine which of the data elements of the remaining associations are unique, wherein a data element is characterized as being unique if no other data element has a similar key;

calculating any implied association which may be implied from any other associations by scanning said list of associations to find any two association entries each of which has a '1' type association, with said two associations having a common data element, with said implied association having the uncommon data elements of said two associations;

storing said implied associations into a second table of entries to form an implied association list;

identifying essential and non-essential associations by scanning said first table of entries and said second table of entries, with an implied association being characterized as non-essential, and a non-implied association being characterized as essential; and storing said database design structure as a function of said associations, wherein said database design structure is determined.

* * * * *